(12) United States Patent
Katayama et al.

(10) Patent No.: US 12,247,110 B2
(45) Date of Patent: Mar. 11, 2025

(54) POLYOLEFIN MICROPOROUS MEMBRANE

(71) Applicant: Asahi Kasei Battery Separator Corporation, Tokyo (JP)

(72) Inventors: Masaki Katayama, Tokyo (JP); Manabu Sekiguchi, Tokyo (JP); Ryoma Kawaguchi, Tokyo (JP); Masaaki Kanao, Tokyo (JP)

(73) Assignee: Asahi Kasei Battery Separator Corporation, Tokyo (JP)

( * ) Notice: Subject to any disclaimer, the term of this patent is extended or adjusted under 35 U.S.C. 154(b) by 701 days.

(21) Appl. No.: 17/619,645

(22) PCT Filed: Jun. 19, 2020

(86) PCT No.: PCT/JP2020/024244
§ 371 (c)(1),
(2) Date: Dec. 16, 2021

(87) PCT Pub. No.: WO2020/256138
PCT Pub. Date: Dec. 24, 2020

(65) Prior Publication Data
US 2022/0411600 A1    Dec. 29, 2022

(30) Foreign Application Priority Data

Jun. 21, 2019 (JP) .................................. 2019-115778
Jan. 31, 2020 (JP) .................................. 2020-015799

(51) Int. Cl.
*C08J 9/00* (2006.01)
*C08J 9/28* (2006.01)
*H01M 50/411* (2021.01)

(52) U.S. Cl.
CPC .............. *C08J 9/28* (2013.01); *C08J 2323/06* (2013.01)

(58) Field of Classification Search
CPC ...... C08J 9/28; C08J 2323/06; C08J 2423/12; C08J 5/18; C08J 9/36; C08J 9/365;
(Continued)

(56) References Cited

U.S. PATENT DOCUMENTS

2007/0015876 A1    1/2007   Inagaki et al.
2015/0179999 A1    6/2015   Kim et al.
(Continued)

FOREIGN PATENT DOCUMENTS

JP    2001-081221 A    3/2001
JP    2003-020357 A    1/2003
(Continued)

OTHER PUBLICATIONS

Kyotani et al., "Super-Molecule Weight Polyethylene Generated in the Process of Gel-Drawing," Kobunshi Ronbunshu, 42 (12): 849-856 (1985) (see English abstract).
(Continued)

*Primary Examiner* — K. Boyle
(74) *Attorney, Agent, or Firm* — Morgan, Lewis & Bockius LLP

(57) ABSTRACT

Provided is a polyolefin microporous membrane containing polyethylene, wherein the melting peak of nonrev. heat flow measured by a temperature-modulated DSC method at a temperature rise rate of 1° C./min of the polyolefin microporous membrane is within the range of 141.0° C. to 150.0° C.

13 Claims, 3 Drawing Sheets

(58) Field of Classification Search
CPC ...... C08J 2323/00; Y02E 60/10; C08L 23/12; C08L 23/06; H01M 50/417; H01M 50/489; H01M 50/411
See application file for complete search history.

(56) References Cited

U.S. PATENT DOCUMENTS

| | | | |
|---|---|---|---|
| 2017/0125763 A1* | 5/2017 | Inatomi | H01M 10/0525 |
| 2019/0198836 A1 | 6/2019 | Ishihara | |
| 2019/0252664 A1 | 8/2019 | Ishihara | |
| 2020/0020908 A1 | 1/2020 | Nishimura et al. | |

FOREIGN PATENT DOCUMENTS

| | | |
|---|---|---|
| JP | 2005-314544 A | 11/2005 |
| JP | 2015-193816 A | 11/2015 |
| JP | 2017-165938 A | 9/2017 |
| JP | 2018-131596 A | 8/2018 |
| JP | 2018-141029 A | 9/2018 |
| JP | 6520248 B | 5/2019 |
| WO | 2015/194504 A1 | 12/2015 |
| WO | 2018/043331 A1 | 3/2018 |
| WO | 2018/043335 A1 | 3/2018 |
| WO | 2018/164054 A1 | 9/2018 |
| WO | 2018/180714 A1 | 10/2018 |
| WO | 2019/065073 A1 | 4/2019 |

OTHER PUBLICATIONS

International Search Report issued in corresponding International Patent Application No. PCT/JP2020/024244 dated Sep. 8, 2020.
International Preliminary Report on Patentability and Written Opinion issued in corresponding International Patent Application No. PCT/JP2020/024244 dated Dec. 30, 2021.
Supplementary European Search Report issued in corresponding European Patent Application No. 20826717.9 dated Jul. 7, 2022.

* cited by examiner

POLYOLEFIN MICROPOROUS MEMBRANE

FIELD

The present invention relates to a polyolefin microporous membrane.

BACKGROUND

Polyolefin microporous membranes (hereunder also referred to simply as "PO microporous membranes") are widely used for separation of different substances, or as selective permeation separating membranes or separating materials. Their uses include, for example, uses as microfiltration membranes; as battery separators for lithium ion batteries or fuel cells; as condenser separators; or as matrix materials of functional membranes to be filled with functional materials in order to exhibit novel functions. PO microporous membranes are particularly suitable for use as separators for lithium ion batteries (LIB) widely used in cellular phones, smartphones, wearable devices, laptop personal computers (PCs), tablet PCs and digital cameras.

For use as LIB separators, it has been a conventional requirement for PO microporous membranes to have dimensional stability against temperatures below the melting point of PO and against external stress, shutdown performance near the melting point, and rupture resistance at high temperature. Various types of PO microporous membranes and methods for producing them have been proposed from the viewpoint of balance between the thermostability of LIB separators and their other properties.

PTL 1, for example, describes extrusion of a blended starting material of polyethylene (PE) with a viscosity-average molecular weight (Mv) of 2,000,000 and PE with an Mv of 250,000 in a ratio of 1:1, and simultaneous biaxial stretching of the obtained gelatinous sheet to 7×7 (MD×TD) at 122° C., from the viewpoint of obtaining excellent mechanical properties, electrical characteristics and high temperature properties for a PO microporous membrane suitable for use as a LIB separator.

PTL 2 describes introducing liquid paraffin into a composition obtained by kneading PE with an intrinsic viscosity of 8.5 dl/g to 60 dl/g and PE with an Mv of 510,000 at a mixed weight ratio of 30/70, adjusting the intrinsic viscosity of the composition to 7.0 dl/g or higher, forming a sheet by compression molding of the composition, and stretching the sheet to a stretch ratio of 6×6 (MD×TD) or 4×4 (MD×TD), for extraction of the liquid paraffin, from the viewpoint of PO microporous membrane strength, heat resistance and thin-film formability.

CITATION LIST

Patent Literature

[PTL 1] Japanese Unexamined Patent Publication No. 2003-20357
[PTL 2] Japanese Patent Publication No. 6520248

SUMMARY

Technical Problem

With increasing miniaturization and slimming of LIB-installed devices such as smartphones and wearable devices in recent years, there is a need to further increase the capacity of LIBs beyond levels in the prior art. LIB manufacturers are therefore pursuing advances in increased high-nickel (Ni) contents and separator thin-film formability for positive electrodes, but it has been difficult to simultaneously ensure their safety. Higher film strength, in particular, is necessary to achieve acceptable levels in impact testing, but there is also a need for smaller thicknesses while ensuring such levels. It is also necessary to lower the heat shrinkage of films at high temperatures in oven testing. High-output batteries for power tools such as electrical power tools additionally require high permeability.

However, attempts to produce PO microporous membranes using starting materials of polyethylene with Mv of 2,000,000 or greater (UHMWPE) by the method described in PTL 2 are still not fully satisfactory from the viewpoint mentioned above.

In light of this situation, it is an object of the present invention to provide a polyolefin microporous membrane that can increase safety for electrochemical devices in impact testing and oven testing, as well as a separator for an electrochemical device, and an electrochemical device, using the same.

Solution to Problem

As a result of much diligent research, the present inventors have completed this invention upon finding that safety for a polyolefin microporous membrane in both impact testing and oven testing can be achieved by controlling the non-reversing heat flow melting peak measured by temperature modulated DSC, to within a specific temperature range. Examples of embodiments of the invention are the following.

[1]

A polyolefin microporous membrane comprising polyethylene, wherein the non-reversing heat flow melting peaks measured with temperature increase by temperature modulated DSC at a temperature-elevating rate of 1° C./min are in the range of 141.0° C. to 150.0° C.

[2] The polyolefin microporous membrane according to [1] above, which has a maximum peak height in the range of 141.0° C. to 150.0° C. among the non-reversing heat flow melting peaks measured by temperature modulated DSC at a temperature-elevating rate of 1° C./min.

[3]

The polyolefin microporous membrane according to [1] or [2] above, wherein the viscosity-average molecular weight (Mv) of the polyolefin microporous membrane is 600,000 to 2,000,000.

[4]

The polyolefin microporous membrane according to any one of [1] to [3] above, wherein the polyolefin microporous membrane includes, as the polyethylene, a polyethylene starting material with a viscosity-average molecular weight (Mv) of 600,000 to 2,000,000 at 55 weight % or greater based on the weight of the polyolefin microporous membrane.

[5]

The polyolefin microporous membrane according to any one of [1] to [4] above, wherein the heat shrinkage factor of the polyolefin microporous membrane at 120° C. is 15% or lower in both the MD and TD.

[6]

The polyolefin microporous membrane according to any one of [1] to [5] above, wherein the heat of fusion at 120.0° C. or lower, for the reversing heat flow measured by temperature modulated DSC at a temperature-elevating rate of 1° C./min, is 45 J/g or greater.

[7]

The polyolefin microporous membrane according to any one of [1] to [6] above, wherein the basis weight-equivalent puncture strength of the polyolefin microporous membrane is 70 gf/(g/m$^2$) or greater.

[8]

The polyolefin microporous membrane according to any one of [1] to [7] above, wherein the mean pore size of the polyolefin microporous membrane measured according to the half-dry method is 0.050 μm or smaller.

[9]

The polyolefin microporous membrane according to any one of [1] to [8] above, wherein the maximum shrinkage stress of the polyolefin microporous membrane in thermomechanical analysis (TMA) is 4.0 gf or lower in both the MD and TD.

[10]

The polyolefin microporous membrane according to any one of [1] to [9] above, wherein the membrane thickness of the polyolefin microporous membrane is 8 μm or smaller.

[11]

A separator for an electrochemical device comprising a polyolefin microporous membrane according to any one of [1] to [10] above.

[12]

An electrochemical device comprising the separator for an electrochemical device according to [11] above.

Advantageous Effects of Invention

According to the invention it is possible to achieve a high degree of safety in both impact testing and oven testing for an electrochemical device that comprises a polyolefin microporous membrane as the separator for the electrochemical device.

DESCRIPTION OF EMBODIMENTS

Figure 1:
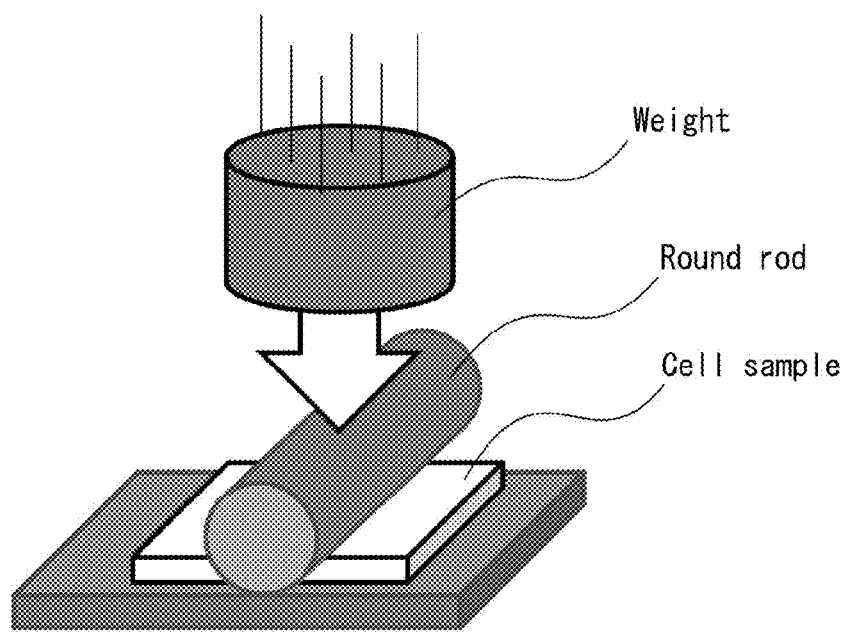
FIG. 1 is a schematic diagram illustrating an impact test.

Embodiments for carrying out the invention (hereunder also referred to as "the embodiments") will be described in detail below, but the invention is not limited by the embodiments and may incorporate various modifications that do not deviate from the gist of the invention. Throughout the present specification, "MD" is defined as the direction of flow of the membrane during formation, and "TD" is defined as the direction crossing 90° with the MD on the plane of the membrane.

The polyolefin microporous membrane (PO microporous membrane) of the embodiment comprises polyethylene (PE) as a polyolefin, and has the properties described below in terms of non-reversing heat flow measured with temperature increase by temperature modulated DSC (Differential Scanning calorimetry) at a temperature-elevating rate of 1° C./min.

Optionally, the PO microporous membrane may have the membrane thickness, mean pore size, heat shrinkage factor, porosity, air permeability and puncture strength as specified below, and may have an inorganic coating layer or adhesive layer formed on its surface. The properties described for the embodiment may each be exhibited independently, or in any desired combination. Unless otherwise specified, the methods for measuring the physical properties of the PO microporous membrane are those measured as described in the Examples.

<Properties Measured by Temperature Modulated DSC>

The PO microporous membrane of the embodiment has a non-reversing heat flow melting peak of 141.0° C. to 150.0° C., when measured with temperature increase by temperature modulated DSC at a temperature-elevating rate of 1° C./min.

From the viewpoint of the shutdown property and membrane formability, a microporous membrane comprising PE (such as HDPE) as a major component (usually at 50 weight % or greater) generally exhibits an endothermic peak in the range of 130.0° C. to 140.0° C. in DSC measurement. This is because the equilibrium melting point of orthorhombic crystals, as the stable structure of polyethylene, is 141.5° C. When the polyethylene which is highly oriented in the stretching axis direction is increased in temperature at a low speed of 1° C./min or lower during DSC measurement, hexagonal crystals simultaneously form as the orthorhombic crystals melt, and an endothermic peak resulting from melting of the hexagonal crystals is observed at a high temperature of 141.0° C. or higher. In other words, the temperature and endotherm of the melting peak represents the strength of molecular orientation of polyethylene in the microporous membrane measured by DSC.

If temperature modulated DSC is used for DSC measurement of the PO microporous membrane, then the measuring components can be separated into a component that follows the thermal response (reversing heat flow) and a component that does not follow the thermal response (non-reversing heat flow). Since the endothermic peak resulting from melting of the hexagonal crystals appears in the non-reversing heat flow, it is possible to distinctly separate the peaks from melting of hexagonal crystals, which are shoulders of the peak from melting of orthorhombic crystals in normal DSC with a high temperature-elevating rate and without temperature modulation. In the PO microporous membrane of the embodiment, the non-reversing heat flow melting peak such as shown in Example 1 (FIG. 2) appears in the range of 141.0° C. to 150.0° C. In a conventional PO microporous membrane, on the other hand, as shown in Comparative Example 9 (FIG. 3), shoulders are seen but the peak does not appear in the range of 141.0° C. to 150.0° C. According to the embodiment, though without being limited to any particular theory, it has been found that a PO microporous membrane having a non-reversing heat flow melting peak in the temperature range of 141.0° C. to 150.0° C., as measured by temperature modulated DSC, is highly oriented and can therefore be used as a separator having higher strength and lower heat shrinkage than in the prior art, and that an electrochemical device (such as a LIB) employing it has satisfactory safety in impact testing and oven testing.

From the viewpoint of achieving high safety in both impact testing and oven testing even as a thin-membrane, a PO microporous membrane has its non-reversing heat flow melting peak in the range of 143.0° C. to 150.0° C. and more preferably in the range of 145.0° C. to 150.0° C., when measured with temperature increase by temperature modulated DSC at a temperature-elevating rate of 1° C./min.

The non-reversing heat flow melting peak in temperature modulated DSC measurement at a temperature-elevating rate of 1° C./min can be controlled so that it is in the temperature range specified above during the production process for a PO microporous membrane, by using a simple (homo)PE starting material, adjusting the Mv of the PE starting material as described below, and adjusting the stretching area increase and/or stretching temperature.

The temperature range for the non-reversing heat flow melting peak can also be controlled by the molecular structure of the polyethylene used. Increasing the polydispersity (Mw/Mn and Mz/Mw) of the starting polymer will tend to increase the non-reversing heat flow melting peak temperature of the PO microporous membrane. Without being limited to any particular theory, it is believed that a larger polydispersity when a starting material of the same average molecular weight is used suggests a greater amount of high molecular weight component, and the presence of the high molecular weight component strengthens entanglement between the polyethylene molecular chains, resulting in increased melting peaks of the hexagonal crystals and improved puncture strength.

From the viewpoint of improved safety in both impact testing and oven testing, the temperature at which the peak height is maximum for the PO microporous membrane is preferably in the range of 141.0° C. to 150.0° C., more preferably in the range of 143.0° C. to 150.0° C. and even more preferably in the range of 145.0° C. to 150.0° C., among the non-reversing heat flow melting peaks measured with temperature increase by temperature modulated DSC at a temperature-elevating rate of 1° C./min. A large heat of fusion at high temperatures of 141.0° C. and higher indicates a high degree of orientation of PE crystals, and a PO microporous membrane in which a high degree of crystal orientation is observed tends to exhibit satisfactory safety in impact testing and oven testing. The temperature at which the peak height is maximum among the non-reversing heat flow melting peaks can be controlled so that it is in the temperature range specified above during the production process for a PO microporous membrane, for example, by using a simple (homo)PE starting material, adjusting the Mv of the PE starting material as described below, adjusting the stretching area increase and/or stretching temperature or adjusting the transverse stretching ratio in the HS step, or by simultaneous biaxial stretching. The melting peak temperature is the temperature at which the value of the non-reversing heat flow (W/g) is minimum, and the peak height is the absolute value of the non-reversing heat flow (W/g) at the melting peak temperature. That is, the temperature at which the peak height is maximum represents the temperature when the value of the non-reversing heat flow (W/g) is minimum.

From the viewpoint of safety in impact testing, the heat of fusion of the PO microporous membrane at 120.0° C. or lower for reversing heat flow, as measured by temperature modulated DSC at a temperature-elevating rate of 1° C./min, is preferably 45 J/g or greater, more preferably 46 J/g or greater, even more preferably 47 J/g or greater and yet more preferably 50 J/g or greater. While the principle is not fully understood, the safety in impact testing tends to be satisfactory if the heat of fusion at 120.0° C. or lower for the reversing heat flow is 45 J/g or greater. From the viewpoint of heat shrinkage, on the other hand, the heat of fusion at 120.0° C. or lower for the reversing heat flow is preferably 70 J/g or lower and more preferably 65 J/g or lower. The heat of fusion at 120.0° C. or lower for the reversing heat flow of the PO microporous membrane can be controlled to within the numerical range specified above by optimizing the starting composition, adjusting the stretching area increase or adjusting the transverse stretching temperature and/or the relaxation temperature during heat setting, for example, in the process of producing the PO microporous membrane.

The peak temperature for reversing heat flow, in the PO microporous membrane measured by temperature modulated DSC at a temperature-elevating rate of 1° C./min, can be adjusted as desired within the range of 130.0° C. to 140.0° C., depending on the melting point of the PE starting material.

<Viscosity-Average Molecular Weight of PO Microporous Membrane>

The viscosity-average molecular weight (Mv) of the PO microporous membrane of the embodiment is preferably 400,000 to 2,000,000. If the molecular weight of the PO microporous membrane itself is higher, then the strength of the membrane will be more readily exhibited and the safety in impact testing and oven testing will tend to be satisfactory. From this viewpoint, the Mv of the PO microporous membrane is more preferably 500,000 or greater, even more preferably 600,000 or greater and most preferably 700,000 or greater. The viscosity-average molecular weight of the PO microporous membrane is also preferably adjusted to 2,000,000 or lower from the viewpoint of inhibiting heat shrinkage by the HS step. From the same viewpoint, the upper limit for the Mv of the PO microporous membrane is preferably 1,500,000 or lower.

Throughout the present specification, the viscosity-average molecular weight of the PO microporous membrane is the value obtained by measuring the Mv of the PO microporous membrane itself. The viscosity-average molecular weight of the PO microporous membrane can be adjusted to this range by changing the compositional ratio of starting polymers with different molecular weights, for example.

<Heat Shrinkage Factor>

As the scope in which electrochemical devices are used continues to increase, it is becoming important to control the high-temperature heat shrinkage factor of PO microporous membranes that are used as separators (such as near the melting point of the PO, or near the melting point of the PO microporous membranes), in order to ensure device safety in impact testing, as well as in high-temperature environments such as in oven testing. A PO microporous membrane having high orientation of PE crystals and with a heat shrinkage factor in the specified range is preferred from the viewpoint of ensuring satisfactory performance in impact testing or oven testing.

More specifically, for improved safety in impact testing and oven testing, the heat shrinkage factor of the PO microporous membrane at 120° C. is preferably 15% or lower in the MD and TD, and more preferably 12% or lower in the MD and TD. The directions that are not constrained in the battery do not necessarily need to be both directions, and the heat shrinkage factor in at least one direction is more preferably 8% or lower and especially 6% or lower from the viewpoint of preventing contact between electrodes due to heat shrinkage of the separator. The lower limit for the heat shrinkage factor of the PO microporous membrane at 120° C. may be −5% or higher, −2% or higher, −1% or higher or 0% or higher, for example, in both the MD and TD.

The means for controlling the heat shrinkage factor of the PO microporous membrane at 120° C. to within the numerical range specified above, or the means for controlling the heat shrinkage factor of the PO microporous membrane at 150° C. to within the numerical range specified above, may be adjustment of the Mv of the PE starting material or adjustment of the TD stretching and/or relaxation ratio and temperature during heat setting (HS) in the production process for the PO microporous membrane, for example.

From the viewpoint of further improving the safety in oven testing for evaluation of higher temperature safety, it is considered important to inhibit heat shrinkage of the PO microporous membrane at 120° C., and to also inhibit heat shrinkage at 150° C. as the high-temperature range. When adjusting the maximum shrinkage stress in the MD and TD to 4.0 gf or lower in TMA of the PO microporous membrane, if not only heat shrinkage at 120° C. but also heat shrinkage at 150° C. is reduced, then the increase in the shrinkage stress at high temperature will be more gentle and the constraining force due to the cell internal pressure or shrinkage inhibiting force by the coating layer can sometimes be utilized to improve the high temperature safety of the device.

From the viewpoint of inhibiting rapid shrinkage of the PO microporous membrane in environments at high temperature (such as near the melting point of PO, or near the melting point of the PO microporous membrane), and also utilizing constraint by the cell internal pressure or coating layer to inhibit shrinkage of the PO microporous membrane, the heat shrinkage factor of the PO microporous membrane at 150° C. is preferably 70% or lower in the MD and TD, and more preferably 69% or lower or 68% or lower in the MD and TD. The lower limit for the heat shrinkage factor of the PO microporous membrane at 150° C. may be −5% or higher, −2% or higher, −1% or higher or 0% or higher, for example, in both the MD and TD.

<Puncture Strength>

The puncture strength in terms of the basis weight ($g/m^2$) of the PO microporous membrane (hereunder referred to as "basis weight-equivalent puncture strength") is preferably 70 $gf/(g/m^2)$ or greater. If the basis weight-equivalent puncture strength of the PO microporous membrane is 70 $gf/(g/m^2)$ or greater, then the safety in impact testing will tend to be satisfactory. Because of this tendency, the basis weight-equivalent puncture strength of the PO microporous membrane is more preferably 90 $gf/(g/m^2)$ or greater and even more preferably 100 $gf/(g/m^2)$ or greater. The upper limit for the basis weight-equivalent puncture strength may be 154 $gf/(g/m^2)$ or lower, for example, from the viewpoint of inhibiting heat shrinkage.

The puncture strength that is not in terms of the basis weight of the PO microporous membrane (hereunder referred to simply as "puncture strength") has a lower limit of preferably 200 gf or greater, and more preferably 230 gf or greater, 250 gf or greater or 280 gf or greater. A puncture strength of 200 gf or greater is preferred from the viewpoint of safety when the electrochemical device has been subjected to impact. The upper limit for the puncture strength of the PO microporous membrane is preferably 680 gf or lower, and more preferably 630 gf or lower, 600 gf or lower or 550 gf or lower, from the viewpoint of relaxing orientation of the membrane during heating and from the viewpoint of the membrane stretching step.

The means for controlling the basis weight-equivalent puncture strength or puncture strength of the PO microporous membrane to be within the ranges specified above may be, for example, the use of a homo-PE starting material, adjustment of the Mv of the PE starting material, or adjustment of the stretching area and/or stretching temperature in the production process for the PO microporous membrane.

<Pore Size>

The pore size of the PO microporous membrane for the embodiment is preferably 0.050 μm or smaller. Throughout the present specification, the pore size of the PO microporous membrane is the mean pore size measured using a palm porometer (CFP-1500AE by Porous Materials, Inc.) according to the half-dry method. Because of its pore size of 0.050 μm or smaller, the PO microporous membrane has low inclusion of contaminants, is resistant to clogging, and improves cycle performance when mounted as a separator in an electrochemical device. A smaller pore size of the PO microporous membrane will tend to further improve the safety in impact testing. This is because a smaller pore size of the PO microporous membrane allows more even dispersion of impact, making fracture less likely to occur.

From the viewpoint of further improving the cycle performance of electrochemical devices, the pore size of the PO microporous membrane is preferably 0.047 μm or smaller, more preferably 0.044 μm or smaller and even more preferably 0.040 μm or smaller. The lower limit for the pore size of the PO microporous membrane may be greater than 0 μm, such as 0.01 μm or greater, for example, so long as micropores are present.

The means for controlling the pore size of the PO microporous membrane to the numerical range specified above may be, for example, adjustment of the Mv of the PE starting material, adjustment of the stretching area increase and/or stretching temperature, simultaneous biaxial stretching, carrying out a stretching step before the extraction step, adjusting the total stretch ratio of the resin molded article, or adjusting the HS stretching temperature and HS relaxation temperature, adjusting so that HS stretching temperature <HS relaxation temperature or adjusting the HS stretch ratio, or adjusting the HS relaxation ratio in the heat setting (HS) step (the above being either alone or in appropriate combinations), in the method for producing the PO microporous membrane described below.

<Membrane Thickness>

From the viewpoint of reducing the volume of the separator in the electrochemical device to increase the energy density, the membrane thickness of the PO microporous membrane is preferably 15 μm or smaller, more preferably 12 μm or smaller, 10 μm or smaller or 8 μm or smaller, and even more preferably 6 μm or smaller or 5 μm or smaller. The membrane thickness of the PO microporous membrane is preferably 1 μm or larger from the viewpoint of maintaining insulation between electrodes.

The means for controlling the membrane thickness of the PO microporous membrane so that it is within the numerical range specified above may be, for example, controlling the polymer content (PC) in the melt kneaded resin, and the (die) lip clearance, cast clearance, stretch ratio, HS stretch ratio and relaxation factor in the method for producing the PO microporous membrane described below.

<Air Permeability>

The air permeability of the PO microporous membrane is preferably 180 seconds or less, more preferably 160 seconds or less and even more preferably 140 seconds or less per 100 $cm^3$ of air, from the viewpoint of ensuring membrane permeability and maintaining the output characteristics of electrochemical devices. From the viewpoint of balance between membrane thickness, porosity and pore size, the lower limit for the air permeability is preferably 50 seconds or longer, more preferably 55 seconds or longer and even more preferably 70 seconds or longer or 80 seconds or longer, per 100 $cm^3$ of air. The air permeability of the PO microporous membrane can be controlled, for example, by adjusting the HS stretch ratio, HS relaxation ratio and HS relaxation temperature in the method for producing a PO microporous membrane as described below, to control them within the numerical ranges specified above.

<Porosity>

The porosity of the PO microporous membrane is preferably 25% or greater, more preferably 30% or greater and even more preferably 33% or greater or 35% or greater. A porosity of 25% or greater is suitable from the viewpoint of ensuring satisfactory output characteristics. The upper limit for the porosity is preferably less than 70%, more preferably 65% or lower and even more preferably 60% or lower. A porosity of less than 70% is preferred from the viewpoint of ensuring the puncture strength described above and of ensuring voltage endurance.

<Shutdown Temperature and Membrane Rupture Temperature (Meltdown Temperature)>

The shutdown temperature of the PO microporous membrane is preferably 151° C. or lower, and more preferably 150° C. or lower, 149° C. or lower, 148° C. or lower, 147° C. or lower, 146° C. or lower, 145° C. or lower, 144° C. or lower, 143° C. or lower, 142° C. or lower or 141° C. or lower. A shutdown temperature of 151° C. or lower has been found to be desirable from the viewpoint of maintaining electrochemical device performance in high-temperature environments such as HEV engine rooms and warm regions, and of ensuring safety during abnormal heat release of electrochemical devices. The lower limit for the shutdown temperature may be 110° C. or higher, 120° C. or higher, 130° C. or higher or 140° C. or higher, for example, from the viewpoint of avoiding obstruction of the pores when heat is applied during the coating step or during the pressing step for battery fabrication.

In order to adjust the shutdown temperature to 151° C. or lower, it is preferred to limit the Mv of the PE starting material to the optimal range mentioned below, to blend PE starting materials with Mv=500,000 in an optimal range, to limit the stretching area increase and/or stretching temperature to optimal ranges, to carry out simultaneous biaxial stretching, to limit the solid content:plasticizer ratio during melt kneading to an optimal range, to limit the HS relaxation temperature in the heat setting step to an optimal range, and to limit the heat setting factor in the heat setting step to an optimal range. If the solid content:plasticizer ratio during melt kneading is low, then the pore size will be large and shutdown will be less likely to occur. The range for the solid content:plasticizer ratio during melt kneading is preferably 20 weight % to 34 weight %, as the component PO percentage based on the weight in the entire melt-kneaded product. If the heat setting temperature in the heat setting step is too high, then the crystallinity of the resin will increase and the melt start temperature of the resin will be higher, and shutdown will be less likely to occur. The optimal range for the HS relaxation temperature is at least a temperature of the melting point of the PO microporous membrane −5° C., and lower than the melting point. If the HS stretch ratio in the heat setting step is too high, the pore size will increase and shutdown will be more difficult. The optimal range for the heat setting factor is from 1.5 times to 2.2 times the dimensions before the heat setting step.

From the viewpoint of temperature stability and safety of electrochemical devices, the membrane rupture temperature (meltdown temperature) of the PO microporous membrane of the embodiment is preferably 150° C. or higher, 155° C. or higher or 160° C. or higher, and more preferably 170° C. or higher, 180° C. or higher, 190° C. or higher, or higher than 200° C. While the upper limit for the membrane rupture temperature of the PO microporous membrane is not restricted, it may be 240° C. or lower, lower than 240° C., 235° C. or lower or 230° C. or lower, depending on the type of polyolefin, the type of component other than PO, and the mixing ratio of PO with other components.

<TMA Maximum Shrinkage Stress>

In thermomechanical analysis (TMA) of the PO microporous membrane, the maximum shrinkage stress is preferably 4.0 gf or lower in both the MD and TD. With the widening range of uses of electrochemical devices, carrying out TMA of PO microporous membranes used as separators is considered important for ensuring device safety in high-temperature environments. From this viewpoint, a PO microporous membrane with a maximum shrinkage stress of 4.0 gf or lower, when incorporated as a separator in an electrochemical device, tends to have inhibited shrinkage at high temperature when in a constrained state (for example, a state in which the separator is tightly held by the inorganic coating layer formed on the PO microporous membrane or by the polar plates in the device), while simultaneously exhibiting force against shrinkage due to the constraining force of internal pressure in the cell, or due to the coating layer, and also improved high temperature safety of the device.

The maximum shrinkage stress of the PO microporous membrane in TMA is more preferably 3.5 gf or lower and even more preferably 3.0 gf or lower in both the MD and TD, from the viewpoint of further improving safety of the electrochemical device in high-temperature environments. The lower limit for the maximum shrinkage stress in TMA is more preferably 1.0 gf or greater, even more preferably 1.5 gf or greater and most preferably 2.0 gf or greater in both the MD and TD, from the viewpoint of increasing adhesiveness between the electrodes and separator when the electrochemical device is pressed during the production steps.

The means for controlling the maximum shrinkage stress of the PO microporous membrane in TMA to within the numerical range specified above may be, for example, using an ethylene homopolymer with a viscosity-average molecular weight (Mv) of 500,000 or greater as the PO starting material; adjusting the Mv of the PO starting material to within the range of 500,000 to 2,000,000; or during the method for producing the PO microporous membrane, controlling the stretch ratio in the stretching step carried out before the extraction step to a factor of no greater than 8 in the MD and TD and/or controlling the total stretch ratio to a factor of no greater than 80, either alone or in appropriate combinations.

<Components in PO Microporous Membrane>

The PO microporous membrane of the embodiment is formed from a resin composition that includes a polyolefin resin. If desired, the resin composition may further include inorganic particles or a resin other than a polyolefin. The total content (PC) of all of the resins in the PO resin composition is preferably 34 weight % or lower from the viewpoint of the strength and membrane thickness of the PO microporous membrane.

Polyolefin resins to be used for the embodiment are not particularly restricted, and examples include polymers obtained by polymerization of monomers such as ethylene, propylene, 1-butene, 4-methyl-1-pentene, 1-hexene and 1-octene (homopolymers, copolymers or multistage polymers, for example). Such polymers may be used alone or in combinations of two or more.

The total proportion of the PE starting material in the PO starting material is preferably 50 weight % to 100 weight % and more preferably 80 weight % to 100 weight %, from the viewpoint of exhibiting a shutdown property.

The PO microporous membrane preferably includes a polyethylene (PE) starting material with an Mv of 600,000 to 2,000,000 at 55 weight % or greater, more preferably 65 weight % or greater and even more preferably 75 weight % or greater, based on the weight of the PO microporous membrane. If a PE starting material with an Mv of 700,000 to 2,000,000 is included at 55 weight % or greater in the PO microporous membrane then the crystals will be highly oriented during stretching, tending to result in high strength and low heat shrinkage of the PO microporous membrane. From the same viewpoint, the PO starting material used for production of the PO microporous membrane is preferably ethylene homopolymer, and more preferably ethylene homopolymer with an Mv of 600,000 to 2,000,000. The amount of polyolefin resin in the PO microporous membrane is preferably 60 weight % or greater, more preferably 70 weight % or greater, even more preferably 80 weight % or greater and most preferably 90 weight % or greater, based on the weight of the PO microporous membrane.

Examples of polyolefin resins include low-density polyethylene (density: ≥0.910 g/cm$^3$ and <0.930 g/cm$^3$), linear low-density polyethylene (density: ≥0.910 g/cm$^3$ and <0.940 g/cm$^3$), medium-density polyethylene (density: ≥0.930 g/cm$^3$ and <0.942 g/cm$^3$), high-density polyethylene (density: ≥0.942 g/cm$^3$), ultrahigh molecular weight polyethylene (density: ≥0.910 g/cm$^3$ and <0.970 g/cm$^3$), isotactic polypropylene, atactic polypropylene, polybutene and ethylene-propylene rubber. Any of these may be used alone or in combinations of two or more. From the viewpoint of obtaining a homogeneous film it is preferred to use polyethylene alone, polypropylene alone, or a blend of polyethylene and polypropylene alone.

From the viewpoint of safety of electrochemical devices comprising PO microporous membranes as separators, the polyolefin resin is preferably medium-density polyethylene (PE) having a density of ≥0.930 g/cm$^3$ and <0.942 g/cm$^3$, such as PE other than high-density polyethylene (HDPE). From the viewpoint of improving safety of electrochemical devices even with thin PO microporous membranes, it is preferred to use at least one selected from among medium-density polyethylene with a viscosity-average molecular weight of less than 1,000,000, and ultrahigh molecular weight polyethylene with a viscosity-average molecular weight of 1,000,000 to 2,000,000 and a density of ≥0.930 g/cm$^3$ and <0.942 g/cm$^3$, at 50 weight % or greater, preferably 60 weight % or greater and more preferably 70 weight % or greater based on the weight of the PO microporous membrane.

The polyolefin resin preferably includes polypropylene (PP) from the viewpoint of ensuring safety in the high temperature range (160° C. or higher), where safety is difficult to ensure when using PE. The polypropylene is preferably propylene homopolymer from the viewpoint of heat resistance. From the viewpoint of further improving heat resistance, the polyolefin resin more preferably includes polyethylene and polypropylene as major components. The proportion of PP starting material in the PO starting material is therefore preferably greater than 0 weight % and 10 weight % or lower. That a specific component is included as a "major component" means that the content of the specific component is 50 weight % or greater.

When PE and PP are used in combination, the polyethylene used is preferably at least one selected from among medium-density polyethylene with a viscosity-average molecular weight of less than 1,000,000 and ultrahigh molecular weight polyethylene with a viscosity-average molecular weight of 1,000,000 to 2,000,000 and a density of ≥0.930 g/cm$^3$ and <0.942 g/cm$^3$, from the viewpoint of achieving balance between strength and permeability and also maintaining a suitable shutdown temperature. The material also preferably contains no ultrahigh molecular weight polyethylene with a viscosity-average molecular weight of 2,000,000 or greater, from the viewpoint of maintaining a suitable shutdown temperature.

The viscosity-average molecular weight of the PO resin (measured by the method described below for the Examples) is preferably 500,000 to 2,000,000. If the molecular weight of the PO resin is higher, then the strength of the membrane will be more readily exhibited and the safety in impact testing and oven testing will tend to be satisfactory. From this viewpoint, the Mv of the PO resin is more preferably 600,000 or greater and even more preferably 700,000 or greater. The viscosity-average molecular weight of the PO resin is also preferably adjusted to 2,000,000 or lower from the viewpoint of inhibiting heat shrinkage by the HS step.

The polydispersity (Mw/Mn) of the polyethylene material is preferably 4.0 to 12.0. The polydispersity (Mw/Mn) is measured by the method described below for the Examples. While the reason is not fully understood, increasing the polydispersity of the starting polymer tends to increase the non-reversing heat flow melting peak temperature of the PO microporous membrane. From the same viewpoint, the lower limit for the polydispersity of the polyethylene starting material is preferably 6.0 or greater and more preferably 7.0 or greater. From the viewpoint of lower porosity during HS, the upper limit is preferably 12.0 or lower and more preferably 10.0 or lower. The range for the polydispersity of the polyethylene starting material is therefore preferred to be 6.0 to 12.0, 7.0 to 12.0, 4.0 to 10.0, 6.0 to 10.0 and 7.0 to 10.0, in that order.

The ratio (Mz/Mw) of the Z-average molecular weight and weight-average molecular weight of the polyethylene starting material is preferably 2.0 to 7.0. The ratio (Mz/Mw) is measured by the method described below for the Examples. While the reason is not fully understood, increasing the Mz/Mw ratio of the starting polymer tends to increase the non-reversing heat flow melting peak temperature of the PO microporous membrane. From the same viewpoint, the Mz/Mw ratio of the polyethylene starting material is preferably 4.0 or higher and more preferably 5.0 or higher. The range for the Mz/Mw of the polyethylene starting material is therefore preferred to be 4.0 to 7.0 and 5.0 to 7.0, in that order.

If necessary, the resin composition may be combined with publicly known additives such as inorganic particles, phenol-based, phosphorus-based or sulfur-based antioxidants; metal soaps such as calcium stearate or zinc stearate; ultraviolet absorbers, light stabilizers, antistatic agents, antifogging agents and color pigments.

[Method for Producing Polyolefin Microporous Membrane]

The method for producing the PO microporous membrane of the embodiment is not particularly restricted, but an example is a method that includes:

- a mixing step (a) in which a resin composition comprising a polyolefin resin and optional additives is mixed,
- an extrusion step (b) in which the mixture obtained in step (a) is melt kneaded and extruded,
- a sheet casting step (c) in which the extruded product obtained in step (b) is cast into the form of a sheet,
- a primary stretching step (d) in which the cast sheet obtained in step (c) is stretched at least once in at least a uniaxial direction,
- an extraction step (e) in which the pore-forming material is extracted from the primary stretched membrane obtained in step (d), and
- a heat setting step (f) in which the extracted membrane obtained in step (e) is subjected to heat setting (HS) at a predetermined temperature.

The method for producing a PO microporous membrane described above provides a PO microporous membrane that has a high degree of safety in both impact testing and oven testing when used as a separator for a lithium ion secondary battery or other type of electrochemical device. The methods of stretching in the MD and TD in the primary stretching step (d) and heat setting in the TD in the heat setting step (f) following the extraction step (e) tend to facilitate adjustment of the pore size and heat shrinkage factor of the resulting PO microporous membrane to within the numerical ranges specified above. The method for producing a PO microporous membrane of the embodiment is not limited to the one described above, and various modifications are possible so long as the gist is maintained.

[Mixing Step (a)]

The mixing step (a) is a step in which a resin composition comprising a polyolefin resin and optional additives is mixed. Other components may also be mixed with the resin composition if necessary during the mixing step (a).

The pore-forming material may be any type such as a plasticizer, for example, so long as it is distinct from the PO resin and inorganic particle materials. The plasticizer used may be a non-volatile solvent that can form a homogeneous solution at above the melting point of the PO resin, such as a hydrocarbon such as liquid paraffin (LP) or paraffin wax; an ester such as dioctyl phthalate or dibutyl phthalate; or a higher alcohol such as oleyl alcohol or stearyl alcohol.

The plasticizer content in the resin composition is preferably 60 weight % to 90 weight % and more preferably 70 weight % to 80 weight %. Adjusting the plasticizer content to 60 weight % or greater lowers the melt viscosity of the resin composition and inhibits melt fracture, thus tending to improve the membrane formability during extrusion. By adjusting the plasticizer content to 90 weight % or lower, on the other hand, it is possible to inhibit elongation of the supply fabric during the membrane formation step.

(Optional Additives)

In step (a), optional additives may be added to the resin composition that comprises the PO. Such additives are not particularly restricted and examples include polymers other than polyolefin resins; antioxidants such as phenol-based, phosphorus-based and sulfur-based compounds; metal soaps such as calcium stearate and zinc stearate; ultraviolet absorbers; light stabilizers; antistatic agents; anti-fogging agents; and color pigments. The total amount of additives is preferably no greater than 20 parts by weight, more preferably no greater than 10 parts by weight and even more preferably no greater than 5 parts by weight, with respect to 100 parts by weight of the polyolefin resin.

The method of mixing in step (a) is not particularly restricted, and all or some of the starting material may also be pre-mixed using a Henschel mixer, ribbon blender or tumbler blender, as necessary. A method of mixing using a Henschel mixer is preferred.

[Extrusion Step (b)]

The extrusion step (b) is a step of melt kneading and extruding the resin composition obtained in step (a). In the extrusion step (b), other components may be mixed with the resin composition if necessary.

The method of melt kneading in step (b) is not particularly restricted, and for example, it may be a method of melt kneading all of the starting material including the mixture prepared in step (a) using a screw extruder such as a single-screw extruder or twin-screw extruder; a kneader; or a mixer. The melt kneading is preferably carried out using a screw in a twin-screw extruder. When melt kneading is carried out, the plasticizer is preferably added in at least two separate portions, and when additives are added in multiple portions, the amount of addition per portion is preferably adjusted to be no greater than 80 wt % of the total amount of addition from the viewpoint of reducing aggregation of the components to allow their homogeneous dispersion. This is preferred as it will inhibit heat release by large-area shutdown and will improve the safety of the cell.

When a pore-forming agent is used in step (b), the melt kneading unit temperature is preferably lower than 200° C. from the viewpoint of homogeneous kneading of the resin composition. The lower limit for the temperature of the melt kneading unit is above the melting point of the polyolefin, from the viewpoint of homogeneously dissolving the polyolefin resin in the plasticizer.

After the antioxidant has been mixed with the PO starting material in the desired concentration during kneading for this embodiment, the surroundings of the mixture are replaced with a nitrogen atmosphere and melt kneading is carried out while maintaining the nitrogen atmosphere, although this is not a limitative restriction.

In step (b), the kneaded blend obtained by kneading is extruded using an extruder such as a T-type die or annular die. The extrusion may be into a single-layer or into multiple layers. The conditions during extrusion are not particularly restricted, and a publicly known method may be employed. From the viewpoint of the membrane thickness of the obtained PO microporous membrane, it is preferred to control the (die) lip clearance.

[Sheet Casting Step (c)]

The sheet casting step (c) is a step in which the extruded product obtained in the extrusion step (b) is cast into the form of a sheet. The cast sheet obtained by the sheet casting step (c) may be a single-layer or multiple layers. The sheet casting method is not particularly restricted, and may be a method of compressed-cooling solidification of the extruded product, for example.

The compression cooling method is not particularly restricted, and for example, it may be a method of direct contact of the extruded product with a cooling medium such as cold air or cooling water; or a method of contacting the extruded product with a coolant-cooled metal roll or pressing machine. From the viewpoint of easier membrane thickness control, the preferred method is contacting the extruded product with a coolant-cooled metal roll or pressing machine.

After the melt kneading in step (b), the temperature set in the step of casting the molten material into a sheet form is preferably set to a higher temperature than the preset temperature of the extruder. The upper limit for the preset temperature is preferably 300° C. or lower and more preferably 260° C. or lower from the viewpoint of heat degradation of the polyolefin resin. For example, when a cast sheet is continuously produced by the extruder, it is preferred to set the preset temperature to be a higher temperature than the set temperature in the extrusion step for the step of casting into a sheet after the melt kneading step, i.e. in the route from the extruder outlet to the T-die, and in the T-die, since this will allow the molten material to be cast into a sheet without separation of the resin composition and the pore-forming material. From the viewpoint of the membrane thickness of the obtained PO microporous membrane, it is preferred to control the cast clearance.

The thickness of the obtained cast sheet may be 600 μm to 2000 μm, depending on the thickness after the stretching in step (d).

[Primary Stretching Step (d)]

The primary stretching step (d) is a step in which the cast sheet obtained from the sheet casting step (c) is stretched at least once, and at least in a uniaxial direction. The stretching step (the stretching step carried out before the subsequent extraction step (e)) will be referred to as "primary stretching", and the membrane obtained by the primary stretching will be referred to as the "primary stretched membrane". In the primary stretching, the cast sheet may be stretched in at least one direction, either in both the MD and TD, or in one or the other of the MD and TD.

The method of stretching in the primary stretching is not particularly restricted, and may be uniaxial stretching with a roll stretcher; TD uniaxial stretching with a tenter; sequential biaxial stretching with a combination of a roll stretcher and tenter, or multiple tenters; or simultaneous biaxial stretching with a biaxial tenter or inflation molding. Simultaneous biaxial stretching is preferred from the viewpoint of improving the safety in impact testing and of stability of the physical properties of the obtained PO microporous membrane.

The stretch ratio in the MD and/or TD for the primary stretching is preferably at least 5 and more preferably 6. If the stretch ratio in the MD and/or TD for the primary stretching is at least 5, then the strength of the obtained PO microporous membrane will tend to be increased. The stretch ratio in the MD and/or TD for the primary stretching is preferably 9 or lower and more preferably 8 or lower or 7 or lower. If the stretch ratio in the MD and/or TD for the primary stretching is 9 or lower, then tearing during stretching will tend to be further inhibited. When biaxial stretching is carried out it may be successive stretching or simultaneous biaxial stretching, and the stretch ratio in each axial direction is preferably 5 to 9, and more preferably 6 to 8 or 6 to 7.

The primary stretching temperature may be selected with reference to the starting resin composition and its concentration in the PO resin composition. The stretching temperature in the MD and/or TD is preferably in the range of 100° C. to 135° C., more preferably 110° C. to 130° C., even more preferably 115° C. to 128° C., and yet more preferably 116° C. to 122° C., 118° C. to 122° C. or 116° C. to 118° C. The stretching temperature is preferably 100° C. or higher from the viewpoint of inhibiting tearing in both the MD and TD, and it is preferably 135° C. or lower from the viewpoint of increasing the membrane strength.

[Extraction Step (e)]

The extraction step (e) is a step in which the pore-forming material is extracted from the primary stretched membrane obtained in the primary stretching step (d), to obtain an extracted membrane. The method of removing the pore-forming material may be, for example, a method of immersing the primary stretched membrane in an extraction solvent to extract the pore-forming material, and then thoroughly drying it. The method of extracting the pore-forming material may be either a batch process or a continuous process. The residue of the pore-forming material, and especially the plasticizer, in the porous membrane is preferably less than 1 weight %.

The extraction solvent used for extraction of the pore-forming material is preferably a poor solvent for the polyolefin resin and a good solvent for the pore-forming material or plasticizer, and one having a boiling point that is lower than the melting point of the polyolefin resin. Such extraction solvents are not particularly restricted, and examples include hydrocarbons such as n-hexane and cyclohexane; halogenated hydrocarbons such as methylene chloride and 1,1,1-trichloroethane; non-chlorine-based halogenated solvents such as hydrofluoroethers and hydrofluorocarbons; alcohols such as ethanol and isopropanol; ethers such as diethyl ether and tetrahydrofuran; and ketones such as acetone and methyl ethyl ketone. These extraction solvents may be collected by a process such as distillation and then reutilized.

[Heat Setting Step (f)]

The heat setting step (f) is a step in which the extracted membrane obtained in the extraction step (e) is heat set at a predetermined temperature. The method of heat treatment is not particularly restricted, and may be a heat setting method in which a tenter or roll stretcher is utilized for stretching and relaxation procedures.

In the stretching procedure of the heat setting step (f), the PO microporous membrane is stretched in either or both the MD and TD, being either bidirectional in the MD and TD, or only in the MD or TD. Heat setting is preferably carried out in at least the TD from the viewpoint of providing a PO microporous membrane that allows a high degree of safety to be achieved in both impact testing and oven testing.

The stretch ratio in each of the MD and TD during the heat setting step (f) is preferably 1.50 to 2.20 and more preferably 1.80 to 2.10. The stretch ratio in the MD and TD in step (f) is preferably at least 1.50 or higher from the viewpoint of causing high orientation of the membrane, increasing the temperature of the non-reversing heat flow melting peak or exhibiting membrane strength, and preferably no higher than 2.20 from the viewpoint of inhibiting tearing.

The stretching temperature in the stretching procedure is in the temperature range of at least 20° C. lower than the peak temperature at the high-temperature end of the non-reversing heat flow measured with temperature increase by temperature modulated DSC, and 10° C. lower than the same peak temperature. A stretching temperature within this range will tend to facilitate control of the pore size of the obtained PO microporous membrane.

Specifically, the stretching temperature in the MD and/or TD during heat setting is preferably 128° C. or higher from the viewpoint of controlling the non-reversing heat flow melting peak in temperature modulated DSC measurement of the PO microporous membrane, more preferably 129° C. or higher from the viewpoint of the output characteristics of the electrochemical device, even more preferably 130° C. or higher from the viewpoint of safety in impact testing, and most preferably 132° C. or higher from the viewpoint of safety in oven testing.

The relaxation procedure of the heat setting step (f) is a procedure of contracting the PO microporous membrane in either or both the MD and TD, being either bidirectional in the MD and TD, or only in the MD or TD. The relaxation ratio in the heat setting step (f) is preferably 0.95 or lower, more preferably 0.90 or lower, or even more preferably 0.85 or lower. A relaxation ratio of 0.95 or lower in step (f) will tend to inhibit heat shrinkage. The relaxation ratio is also preferably 0.50 or higher and even more preferably 0.70 or higher, from the viewpoint of increasing the relaxation temperature. The "relaxation ratio" is the value of the dimensions of the membrane after the relaxation procedure divided by the dimensions of the membrane before the procedure, or the product of the relaxation ratio in the MD and the relaxation ratio in the TD, when both the MD and TD have been relaxed.

Relaxation ratio=(Dimension of membrane after relaxation procedure (m))/(dimension of membrane before relaxation procedure (m))

From the viewpoint of the pore size of the obtained PO microporous membrane, the relaxation temperature in the relaxation procedure is preferably higher than the stretching temperature in the heat setting step (f), while from the viewpoint of controlling the heat shrinkage factor and porosity of the obtained PO microporous membrane, it is more preferably between 20° C. lower than the peak temperature at the high-temperature end of the non-reversing heat flow measured with temperature increase in temperature modulated DSC, and a temperature 10° C. higher than the peak temperature. If the temperature in the relaxation procedure is within this range then it will be possible to not only remove residual stress by the stretching step but also to firmly immobilize orientation of the molecular chains, and it is therefore preferred from the viewpoint of preventing reduction in ion permeability near the melting point of the PO microporous membrane and improving the electrochemical device performance.

The specific relaxation temperature during heat setting is preferably 128° C. or higher from the viewpoint of controlling the non-reversing heat flow melting peak in temperature modulated DSC measurement of the PO microporous membrane, more preferably 131° C. or higher from the viewpoint of the cycle characteristics of the electrochemical device, and even more preferably 133° C. or higher from the viewpoint of safety.

The order of steps (a) to (f) may be changed as desired so long as the effect of the invention is not impeded. After steps (a) to (f), the total stretch ratio of the PO microporous membrane is in the range of preferably 50 to 100, more preferably 60 to 90 and even more preferably 70 to 80. The term "total stretch ratio" used here means the value obtained by multiplying the stretch ratio in the MD and/or TD in the primary stretching step (d) by the stretch ratio and/or relaxation ratio in the heat setting step.

[Other Steps]

The method for producing a PO microporous membrane of the embodiment may also include other steps in addition to steps (a) to (f). The other steps are not particularly restricted and may include, for example, a layering step in which a plurality of single-layer PO microporous membranes are stacked, as a step for obtaining a layered PO microporous membrane in addition to the heat setting step described above. Alternatively, the method for producing a PO microporous membrane may include a releasing step in which the layered body obtained by co-extrusion is released after steps (a) to (f) to obtain two or more single-layer membranes. The method for producing a PO microporous membrane of the embodiment may also include a surface treatment step for surface treatment such as electron beam irradiation, plasma irradiation, surfactant coating or chemical modification on the surface of a PO microporous membrane. A material of inorganic particles may also be coated onto one or both sides of the PO microporous membrane to obtain a PO microporous membrane comprising an inorganic material layer.

<Inorganic Coating Layer Formation>

An inorganic coating layer may also be formed on the PO microporous membrane surface from the viewpoint of safety, dimensional stability and heat resistance. The inorganic coating layer is a layer including an inorganic component such as inorganic particles, and if desired, it may include a binder resin for binding together the inorganic particles, and a dispersing agent for dispersion of the inorganic particles in the solvent.

Examples of materials for the inorganic particles in the inorganic coating layer include oxide-based ceramics such as alumina, silica, titania, zirconia, magnesia, ceria, yttria, zinc oxide and iron oxide; nitride-based ceramics such as silicon nitride, titanium nitride and boron nitride; ceramics such as silicon carbide, calcium carbonate, magnesium sulfate, aluminum sulfate, barium sulfate, aluminum hydroxide, aluminum hydroxide oxide, potassium titanate, talc, kaolinite, dickite, nacrite, halloysite, pyrophyllite, montmorillonite, sericite, mica, amesite, bentonite, asbestos, zeolite, calcium silicate, magnesium silicate, diatomaceous earth and quartz sand; and glass fibers. The inorganic particles may be used alone, or more than one type may be used together.

Examples of binder resins include conjugated diene-based polymers, acrylic polymers, polyvinyl alcohol-based resins and fluorine-containing resins. The binder resin may be in the form of a latex, and may include water or an aqueous solvent.

The dispersing agent is adsorbed onto the surfaces of the inorganic particles in the slurry, thus stabilizing the inorganic particles by electrostatic repulsion or other force, and examples thereof include polycarboxylic acid salts, sulfonic acid salts, polyoxyethers and surfactants.

As the particle size distribution of the inorganic particles, the particle size D50 is in the range of preferably 0.05 μm to 1.2 μm, more preferably 0.05 μm to 0.8 μm and even more preferably 0.05 μm to 0.5 μm. If D50 is 0.05 μm or greater then migration of the inorganic particles in the pores of the PO microporous membrane from the porous layer may be inhibited, resulting in satisfactory permeability of the multilayer porous membrane. If D50 is 1.2 μm or lower, then the porous layer will tend to exhibit heat resistance.

The inorganic coating layer can be formed, for example, by coating and drying a slurry containing the components mentioned above onto the surface of the PO microporous membrane.

<Formation of Adhesive Layer>

The PO microporous membrane surface may also be provided with an adhesive layer comprising a thermoplastic resin, in order to prevent blistering due to generation of gas or deformation of the laminated battery, as a type being increasingly employed in recent years in vehicle-mounted batteries in order to increase energy density. The thermoplastic resin in the adhesive layer is not particularly restricted, and examples include resins with melting points and/or glass transition temperatures of 180° C. or higher, among which are polyolefins such as polyethylene and polypropylene; fluorinated resins such as polyvinylidene fluoride and polytetrafluoroethylene; fluorinated rubbers such as vinylidene fluoride-hexafluoropropylene copolymer, vinylidene fluoride-tetrafluoroethylene copolymer, vinylidene fluoride-hexafluoropropylene-tetrafluoroethylene copolymer and ethylene-tetrafluoroethylene copolymer; rubbers such as styrene-butadiene copolymer and its hydrogenated forms, acrylonitrile-butadiene copolymer and its hydrogenated forms, acrylonitrile-butadiene-styrene copolymer and its hydrogenated forms, (meth)acrylic acid ester copolymer, styrene-acrylic acid ester copolymer, acrylonitrile-acrylic acid ester copolymer, ethylene-propylene rubber, polyvinyl alcohol and polyvinyl acetate; cellulose derivatives such as ethyl cellulose, methyl cellulose, hydroxyethyl cellulose and carboxymethyl cellulose; and polyphenylene ether, polysulfone, polyethersulfone, polyphenylene sulfide, polyetherimide, polyamideimide, polyamide, polyester and the like.

After the heat setting step (f), layering step or surface treatment step, the master roll on which the PO microporous membrane is wound may be subjected to aging treatment under predetermined temperature conditions, and may be followed by rewinding back onto the master roll. This will tend to produce a PO microporous membrane with higher thermal stability than the PO microporous membrane before rewinding. The temperature for aging treatment of the master roll in the case described above is not particularly restricted, but it is preferably 35° C. or higher, more preferably 45° C. or higher and even more preferably 60° C. or higher. From the viewpoint of maintaining permeability for the PO microporous membrane, the temperature for aging treatment of the master roll is also preferably 120° C. or lower. The time required for aging treatment is not particularly restricted, but it is preferably 24 hours or longer so that the aforementioned effect can be exhibited more easily.

<Separator for Electrochemical Device>

The polyolefin microporous membrane of the embodiment can be utilized as a separator for an electrochemical device such as a lithium ion secondary battery. The polyolefin microporous membrane can be incorporated into a lithium ion secondary battery to inhibit thermal runaway of the lithium ion secondary battery.

<Electrochemical Device>

One mode of the invention is an electrochemical device having a PO microporous membrane of the embodiment wound up, or housing a wound body or layered body comprising a plurality of layered membranes. Examples of electrochemical devices include nonaqueous electrolyte solution batteries, nonaqueous electrolyte batteries, non-aqueous lithium ion secondary batteries, nonaqueous gel secondary batteries, solid secondary batteries, lithium ion capacitors and electrical double layer capacitors.

A nonaqueous electrolyte battery of the embodiment comprises a nonaqueous electrolyte solution battery separator comprising the PO microporous membrane described above, a positive plate, a negative plate, and a nonaqueous electrolyte solution (which includes a nonaqueous solvent and a metal salt dissolved in it). Specifically, a positive plate comprising a transition metal oxide capable of occluding and discharging lithium ions, and a negative plate capable of occluding and discharging lithium ions, are wound or layered facing each other via the nonaqueous electrolyte solution battery separator, and a nonaqueous electrolyte solution is held and housed in the container.

The positive plate will now be described. Examples of materials to be used for the positive electrode active material include lithium complex metal oxides such as lithium nickelate, lithium manganate or lithium cobaltate, and lithium composite metal phosphates such as lithium iron phosphate. For the positive electrode active material, a conductive agent and binder are kneaded and then coated and dried as a positive electrode paste onto a positive electrode collector such as an aluminum foil, which is subsequently rolled to a predetermined thickness and then cut to a predetermined dimension to obtain a positive plate. The conductive agent used may be a metal powder which is stable under the positive electrode potential, and examples include carbon blacks such as acetylene black, and graphite materials. The binder used may be a material that is stable under the positive electrode potential, such as polyvinylidene fluoride, modified acrylic rubber or polytetrafluoroethylene.

The negative plate will now be described. The negative electrode active material used may be a material that is capable of occluding lithium. Specifically, at least one type is used which is selected from the group consisting of graphite, silicide and titanium alloy materials. Examples of materials to be used for the negative electrode active material of the non-aqueous electrolyte secondary battery include metals, metal fibers, carbon materials, oxides, nitrides, silicon compounds, tin compounds and any of various alloy materials. Particularly preferred are silicon (Si) or tin (Sn) alone or as alloys or compounds, or silicon compounds or tin compounds in solid solution, as these will tend to increase the energy density of the battery.

Examples of carbon materials include natural graphite, coke, graphitizing carbon, carbon fibers, spherical carbon, artificial graphite and amorphous carbon.

Any of the aforementioned materials may be used alone as the negative electrode active material, or two or more may be used in combination. For the negative electrode active material, a binder is kneaded and then coated and dried as a negative electrode paste onto a negative electrode collector such as a copper foil, which is subsequently rolled to a predetermined thickness and then cut to a predetermined dimension to obtain a negative plate. The binder used may be a material that is stable under the negative electrode potential, examples of which include PVDF and styrene-butadiene rubber copolymer.

The nonaqueous electrolyte solution will now be described. A nonaqueous electrolyte solution generally includes a nonaqueous solvent and a metal salt such as a lithium salt, sodium salt or calcium salt dissolved in it. Nonaqueous solvents to be used include cyclic carbonic acid esters, linear carbonic acid esters and cyclic carboxylic acid esters. Examples of lithium salts include $LiPF_6$, $LiClO_4$, $LiBF_4$, $LiAlCl_4$, $LiSbF_6$, $LiSCN$, $LiCF_3SO_3$, $LiCF_3CO_2$, $Li(CF_3SO_2)_2$, $LiAsF_6$, lower aliphatic lithium carboxylates, LiCl, LiBr, LiI, boric acid salts and imides.

Unless otherwise specified, the methods for measuring the different parameters mentioned above were based on the measuring methods in the following Examples.

EXAMPLES

The present embodiment will now be described in detail by Examples and Comparative Examples, with the understanding that there are no limitations imposed by the Examples so long as the gist of this embodiment is not exceeded. The physical properties in the Examples were measured by the following methods. Unless otherwise specified, they were measured in an environment at room temperature (23° C.) and 40% humidity.

(1) Molecular Weight and Density (1a) Measurement of Polydispersity (Mw/Mn and Mz/Mw) of Polyethylene by GPC-Light Scattering (Light Scattering—Absolute Method).

The number-average molecular weight (Mn), weight-average molecular weight (Mw), z-average molecular weight (Mz), polydispersity (Mw/Mn and Mz/Mw) were measured for each resin using GPC (gel permeation chromatography) with a differential refractometer connected to a light scattering detector, under the following conditions. Specifically, a PL-GPC200 by Agilent Co. was used, having a built-in differential refractometer (RI) and light scattering detector (PD2040). The columns used were two Agilent PLgel MIXED-A (13 μm, 7.5 mm I.D×30 cm) linked together. Measurement was carried out with a column temperature of 160° C., using 1,2,4-trichlorobenzene (containing 0.05 wt % of 4,4'-thiobis(6-tert-butyl-3-methylphenol)) as an eluent, under conditions with a flow rate of 1.0 ml/min and an injection rate of 500 μL, to obtain an RI chromatogram and light scattering chromatograms at a scattering angle of 15° and 90°. The obtained chromatogram was analyzed using Cirrus software to obtain the number-average molecular weight (Mn), weight-average molecular weight (Mw) and z-average molecular weight (Mz). The values of Mz and Mw were used to obtain the polydispersity (Mz/Mw), and the values of Mw and Mn were used to obtain the polydispersity (Mw/Mn). The value used for the refractive index increase of polyethylene was 0.053 ml/g.

(1b) Measurement of Weight-Average Molecular Weight (Mw) and Number-Average Molecular Weight (Mn) (GPC—Relative Method)

Sample Preparation

The polyolefin starting material was weighed out, and the eluent 1,2,4-trichlorobenzene (TCB) was added to a concentration of 1 mg/ml. The mixture was allowed to stand in a high-temperature melter at 160° C. for 30 minutes, after which it was oscillated for 1 hour at 160° C., and total dissolution of the sample was visually confirmed. The sample solution was filtered with a 0.5 μm filter while at 160° C., and the filtrate was used as the GPC measuring sample.

GPC Measurement

Using a PL-GPC220™ by Agilent Co. as the GPC apparatus, with two 30 cm TSKgel GMHHR-H(20) HT™ columns by Tosoh Corp., 500 μl of the GPC measuring sample prepared as described above was injected into the apparatus and GPC measurement was carried out at 160° C.

A calibration curve was drawn using commercially available monodisperse polystyrene of known molecular weight as the standard substance, and the molecular weight distribution data of each sample in terms of polystyrene were obtained. For polyethylene, the molecular weight distribution data in terms of polyethylene were obtained by multiplying the molecular weight distribution data in terms of polystyrene by 0.43 (polyethylene Q factor/polystyrene Q factor=17.7/41.3). The weight-average molecular weight (Mw) and number-average molecular weight (Mn) of each sample were calculated from the data to obtain the molecular weight distribution (Mw/Mn).

(1c) Viscosity-Average Molecular Weight (Mv)

The limiting viscosity [η] (dl/g) at 135° C. in a decalin solvent was determined based on ASTM-D4020. For the PO microporous membrane and polyethylene starting material, the Mv was calculated by the following formula.

$$[\eta]=6.77\times10^{-4}Mv^{0.67}$$

For a polypropylene starting material, the Mv was calculated by the following formula.

$$[\eta]=1.10\times10^{-4}Mv^{0.80}$$

(1d) Density (g/cm$^3$)

The density of the sample was measured by the density gradient tube method (23° C.), according to JIS K7112: 1999.

(2) Membrane Thickness (μm)

A KBM™ microthickness meter by Toyo Seiki Co., Ltd. was used to measure the membrane thickness of the PO microporous membrane or porous layer at room temperature (23±2° C.).

(3) Porosity (%)

A 10 cm×10 cm-square sample was cut out from the PO microporous membrane, and its volume (cm$^3$) and mass (g) were determined and used together with the density (g/cm$^3$) by the following formula, to obtain the porosity.

Porosity (%)=(Volume−mass/density)/volume×100

(4) Air Permeability (Sec/100 cm$^3$)

The air permeability resistance according to JIS P-8117 was used as the air permeability.

The air permeability resistance of the PO microporous membrane was measured by determining the air permeability resistance of the PO microporous membrane using a G-B2™ Gurley air permeability tester by Toyo Seiki Kogyo Co., Ltd. according to JIS P-8117, in an environment of 23° C. temperature, and 40% humidity, and was used as the air permeability.

(5) Puncture Strength (Gf) and Basis Weight-Equivalent Puncture Strength (gf/(g/m$^2$))

Using a Handy Compression Tester KES-G5™ by Kato Tech Corp., the PO microporous membrane was anchored with a specimen holder having an opening diameter of 11.3 mm. The center section of the anchored microporous membrane was then subjected to a puncture test using a needle with a tip having a diameter of 1.0 mm and a curvature radius of 0.5 mm, at a puncture speed of 2 mm/sec and in an atmosphere of 23° C., 40% humidity, to determine the raw puncture strength (gf) as the maximum puncture load, also calculating the value in terms of basis weight (gf/(g/m$^2$)).

(6) Pore Size (μm)

The mean pore size (μm) of the PO microporous membrane was measured using a palm porometer (CFP-1500AE by Porous Materials, Inc.) by the half-dry method. A perfluoropolyester by the same company trade name: "Galwick", surface tension: 15.6 dyn/cm) was used as the immersion liquid. For the dry curve and wet curve, the applied pressure and air permeation were measured and the mean pore size dHD (μm) was determined by the following formula from the pressure PHD (Pa) at the intersection between ½ of the obtained dry curve and the wet curve, and recorded as the pore size.

$$dHD=2860\times\gamma/PHD$$

(7) Heat Shrinkage Factor (%) at 120° C. or 150° C.

The PO microporous membrane was cut out to 100 mm in the MD direction and 100 mm in the TD direction, and allowed to stand for 1 hour in an oven at a prescribed temperature (120° C. or 150° C.). During this time, the sample was sandwiched between two sheets of paper so as to avoid direct contact of the sample with warm air. The paper used was V-Paper monochromatic copy/printer paper (basis weight 64 g/m$^2$) by Fuji Xerox-Interfield. After removing the sample from the oven and cooling it, the length (mm) was measured and the heat shrinkage factor was calculated by the following formula. Measurements were carried out in both the MD direction and the TD direction.

Heat shrinkage factor (%)={(100−length after heating)/100}×100

(8) Endothermic Peak Temperature (° C.) in Temperature Modulated DSC

The apparatus used was a DSC Q200 by TA Instruments. The measurement was carried out under the following conditions.

Measuring temperature range: 40° C. to 190° C.
Mean temperature-elevating rate: 1.0° C./min
Temperature modulating amplitude: ±0.16° C.
Temperature modulating cycle: 60 seconds
Measuring atmosphere: 50 ml/min nitrogen atmosphere The temperature calibration and heat quantity calibration were carried out using indium as the standard substance under conditions with a temperature-elevating rate of 1.0° C./min.

Sample container: AI open type sample container and crimp cover, by Hitachi High-Tech Science
Sampling method: The folded membrane sample was punched to 4.5 mmφ and placed in a 5 to 7 mg sample container, and crimped.

Calculation of the reversing heat flow and non-reversing heat flow was carried out using Universal Analysis 2000 analysis software by TA Co. Among the components of the total heat flow obtained under these conditions, the component that followed temperature modulation was used as the reversing heat flow while the component obtained by subtracting the reversing heat flow from the total heat flow was used as the non-reversing heat flow. The endothermic peak temperature (° C.) was calculated from the reversing heat flow and non-reversing heat flow obtained in this manner, among which the temperature (° C.) at which the endothermic peak height in the non-reversing heat flow was maximum was recorded as the maximum peak temperature (° C.).

(9) Heat Quantity (J/g) to 120.0° C. in Reversing Heat Flow

Using Universal Analysis 2000 analysis software by TA Co., a baseline for the obtained reversing heat flow was drawn at 42.0° C. to 170.0° C., and the area formed from the perpendicular at 120.0° C. was calculated and the endotherm to 120.0° C. was recorded as the heat of fusion.

(10) Shutdown Temperature Measurement

Two 10 μm-thick Ni foils (A, B) were prepared, masking one Ni foil A with TEFLON® tape leaving a 15 mm-long, 10 mm-wide rectangular section, while placing a measuring sample separator on the other Ni foil B, and anchoring both ends of the separator with TEFLON® tape. The Ni foil B was immersed in a 1 mol/L lithium borofluoride electrolyte solution (solvent:mixed solvent with propylene carbonate/ethylene carbonate/γ-butyllactone=1/1/2 volume ratio) to impregnate the separator with the electrolyte solution, after which the Ni foils (A, B) were attached and both sides were held by two glass plates using clips. The Ni foil electrode fabricated in this manner was placed in an oven at 25° C. and increased in temperature to 200° C. at 2° C./min. The impedance change was measured using an "AG-4311" electrical resistance meter (by Ando Electric Co., Ltd.), under conditions of 1 V, 1 kHz. The temperature at which the impedance value reached 1000Ω during the measurement was recorded as the shutdown temperature (° C.).

(11) Membrane Rupture Temperature

In the shutdown temperature measurement, the temperature at which the electrical resistance value reached $10^2\Omega$ to $10^3\Omega$ and then fell back to below $10^3\Omega$ was recorded as the membrane rupture temperature. When the resistance value was already above $10^3\Omega$ at the start, however, the membrane rupture temperature was recorded as the temperature at which it fell to below $10^3\Omega$.

(12) TMA Maximum Shrinkage Stress (gf)

The heat shrinkage of the sample was measured using a TMA50™ by Shimadzu Corp. When measuring the value in the MD (TD) direction, the sample cut out to a width of 3 mm in the TD (MD) was anchored to a chuck with a chuck distance of 10 mm, and set in a dedicated probe. With an initial load of 1.0 g and in fixed-length measuring mode, the sample was heated from 30° C. to 200° C. at a temperature-elevating rate of 10° C./min, the load (gf) generated at that time was measured, and the maximum was recorded as the MD (or TD) maximum thermal shrinkage stress (gf).

(13) Mean Particle Size and Particle Size Distribution of Inorganic Particles

For the particle size distribution and median diameter (μm) of the inorganic particle dispersion or slurry coating solution, the particle size distribution of the inorganic particle dispersion or slurry coating solution was measured using a laser particle size distribution analyzer (Microtrac MT3300EX by Nikkiso Co., Ltd.). When necessary, the particle size distribution of the water or binder polymer was used as the baseline for adjustment of the particle size distribution of the inorganic particle dispersion or slurry coating solution. The particle size where the cumulative frequency was 50% was recorded as D50.

(14) Battery Evaluation

A battery was fabricated by the following steps a-1 to a-5.

a-1. Fabrication of Positive Electrode

After mixing 90.4 weight % of a nickel, manganese and cobalt complex oxide (NMC) (Ni:Mn:Co=1:1:1 (element ratio), density: 4.70 g/cm$^3$), as the positive electrode active material, 1.6 weight % of graphite powder (KS6) (density: 2.26 g/cm$^3$, number-mean particle size: 6.5 μm) and 3.8 weight % of acetylene black powder (AB) (density: 1.95 g/cm$^3$, number-mean particle size: 48 nm), as conductive aids, and 4.2 weight % of polyvinylidene fluoride (PVDF) (density: 1.75 g/cm$^3$) as a binder, the mixture was dispersed in N-methylpyrrolidone (NMP) to prepare a slurry. The slurry was coated using a die coater onto one side of a 20 μm-thick aluminum foil sheet as the positive electrode collector, and dried at 130° C. for 3 minutes, after which it was compression molded using a roll press, to fabricate a positive electrode. The coating amount of the positive electrode active material was 109 g/m$^2$.

a-2. Fabrication of Negative Electrode

In purified water there were dispersed 87.6 weight % of graphite powder A (density: 2.23 g/cm$^3$, number-mean particle size: 12.7 μm) and 9.7 weight % of graphite powder B (density: 2.27 g/cm$^3$, number-mean particle size: 6.5 μm) as negative electrode active materials, and 1.4 (solid) weight % of carboxymethyl cellulose ammonium salt (1.83 weight % solid concentration aqueous solution) and 1.7 (solid) weight % of diene rubber latex (40 weight % solid concentration aqueous solution) as binders, to prepare a slurry. The slurry was coated using a die coater onto one side of a 12 μm-thick copper foil sheet as the negative electrode collector, and dried at 120° C. for 3 minutes, after which it was compression molded using a roll press to fabricate a negative electrode. The coating amount of the negative electrode active material was 52 g/m$^2$.

a-3. Preparation of Nonaqueous Electrolyte Solution

A nonaqueous electrolyte solution was prepared by dissolving 1.0 mol/L concentrated LiPF$_6$, as a solute, in a mixed solvent of ethylene carbonate:ethyl methyl carbonate=1:2 (volume ratio).

a-4. Formation of Adhesive Layer

An adhesive layer was formed on the PO microporous membranes obtained in the Examples and Comparative Examples, by the following steps.

In a reactor equipped with a stirrer, reflux condenser, drip tank and thermometer there were loaded 64 parts water and 0.25 part of PELEX SS-L (sodium alkyldiphenyl ether disulfonate by Kao Corp., solid content: 45%). In addition, 0.15 part of ammonium persulfate (2% aqueous solution) was added to the reactor while keeping the reactor temperature at 80° C.

Five minutes after addition of the ammonium persulfate (2% aqueous solution), the emulsified liquid prepared as described below was added dropwise to the reactor from a drip tank over a period of 150 minutes.

Preparation of Emulsified Liquid:

There were mixed 24 parts of methyl methacrylate (MMA), 34 parts of butyl acrylate (BA), 1.5 parts of acrylic acid (AA), 0.1 part of n-dodecylmercaptane (nDDM), 1.5 parts of PELEX SS-L, 0.15 part of ammonium persulfate and 69 parts of water with a homomixer at 6000 rpm for 5 minutes, to prepare an emulsified liquid.

Upon completion of the dropwise addition of the emulsified liquid, the temperature of the reactor was kept at 80° C. for a period of 60 minutes, after which it was cooled to room temperature. Next, a 25% ammonia water solution was added to the reactor to adjust the pH to 8.0, water was added thereto, and the solid content was adjusted to 40 weight %, to obtain an acrylic emulsion as an adhesive coating solution.

After homogeneously dispersing 7.5 parts by weight of the obtained emulsion in 92.5 parts by weight of water to prepare a coating solution, a gravure coater was used to coat it onto one surface of the PO microporous membrane. The coated solution was then dried at 60° C. to remove the water. The other side was also coated with the coating solution in the same manner and dried to obtain an electrochemical cell separator with an adhesive layer.

a-5. Fabrication of Battery

The positive electrode, negative electrode and nonaqueous electrolyte solution obtained in a-1 to a-3 above, and the separator obtained in a-4 above, were used to fabricate a laminated secondary battery with a size of 100 mm×60 mm and a capacity of 3000 mAh, charged with constant current, constant voltage (CCCV) over a period of 3 hours under conditions with a current value of 1 A (0.3 C) and a final cell voltage of 4.2 V.

a-6. Measurement of Capacity (mAh)

The laminated secondary battery assembled as described above was used for 6 hours of constant current, constant voltage (CCCV) charging under conditions with a current value of 1500 mA (0.5 C) and a final cell voltage of 4.2 V. The current value just before completion of charging was approximately zero. The battery was then allowed to stand for 1 week in a 25° C. atmosphere (aging).

A cycle was then carried out, which comprised charging with a constant current, constant voltage (CCCV) for 3 hours under conditions with a current value of 3000 mA (1.0 C) and a final cell voltage of 4.2 V, and discharging to a cell voltage of 3.0 V at a constant current value (CC) of 3000 mA. The discharge capacity during this time was recorded as the initial discharge capacity X. A battery with an initial discharge capacity X of 3000±10 mAh was used for the battery evaluation.

b. Output Test (25° C.)

A laminated secondary battery assembled as described above and selected for evaluation was used for measurement of the 1 C discharge capacity and 5 C discharge capacity up to a final discharge voltage of 3 V, in an isothermic state in an atmosphere of 25° C., and the value for 5 C capacity/1 C capacity was recorded as the output characteristic value. The output characteristic value was evaluated on the following scale.
  A: Output characteristic value of ≥0.90.
  B: Output characteristic value of ≥0.80 and <0.90.
  C: Output characteristic value of <0.80.

c. Cycle Test

A battery assembled as described above and selected for evaluation was used for charge-discharge 100 times under cycle conditions of (i) constant-current/constant-voltage charge for a total of 8 hours at a current of 0.5 C and a maximum voltage of 4.2 V, (ii) 10 minutes pause, (iii) constant-current discharge at a current value of 0.5 C and a final voltage of 3.0 V, (iv) 10 minutes pause. Each charge-discharge treatment was carried out in an atmosphere at 25° C. The capacity retention (%) was then determined by multiplying, the ratio of the discharge capacity at the 100th cycle with respect to the initial battery capacity X (mAh), by 100. The capacity retention was evaluated on the following scale.
  A: Capacity retention (%) of ≥90%.
  B: Capacity retention (%) of ≥80% and <90%.
  C: Capacity retention (%) of <80%.

d. Oven Test (150° C.)

Using a battery assembled as described above and selected for evaluation, the charged battery was increased from room temperature to 150° C. at 5° C./min and allowed to stand at 150° C. for a predetermined time, and the ignition conditions were then confirmed. The results of high-temperature storage testing were evaluated on the following scale.
  A: No ignition for a standing time of 60 minutes or longer.
  B: Ignition with a standing time of 30 minutes or longer and less than 60 minutes.
  C: Ignition with a standing time of less than 30 minutes.

e. Impact Test

FIG. 1 is a schematic diagram illustrating an impact test.

In impact testing, a round bar ($\varphi$=15.8 mm) was set on a sample disposed on a test stand, so that the sample and the round bar were generally perpendicular, and an 18.2 kg deadweight was dropped onto the top surface of the round bar from a position at a height of 61 cm from the round bar, to observe the effect of impact on the sample.

The procedure for the impact test in the Examples and Comparative Examples will now be explained, with reference to FIG. 1.

The laminated secondary battery assembled as described above and selected for evaluation was used for 3 hours of constant current, constant voltage (CCCV) charging under conditions with a current value of 3000 mA (1.0 C) and a final cell voltage of 4.2 V.

The battery assembled as described above and selected for evaluation was then placed flat along a flat surface in an environment at 25° C., and a stainless steel round bar with a diameter of 15.8 mm was disposed on it in a manner crossing the center section of the battery. The round bar was disposed so that the long axis was parallel to the lengthwise direction of the separator. An 18.2 kg deadweight was dropped from a height of 61 cm so that an impact perpendicular to the long axial direction of the battery was produced from the round bar disposed at the center of the battery. Following impact, the surface temperature of the battery was measured. The test was conducted for 5 cells at a time, and evaluation was made on the following scale. Scores of A (satisfactory) and B (acceptable) were passing levels in the evaluation. The surface temperature of the battery is the temperature measured with a thermocouple (K-seal type) at a position 1 cm from the bottom side of the exterior body of the battery.
  A (Satisfactory): Surface temperature increase ≤30° C. for all cells.
  B (Acceptable): Some cells with surface temperature of ≥30° C. and ≤100° C., but surface temperature of 100° C. for all cells.
  C (Unacceptable): One or more cells with surface temperature of >100° C., or ignition.

Example 1

Using the polyethylene (PE) types and polypropylene (PP) types listed in Table 1, and the PE types, PP types and starting material composition ratios listed in Table 2, the PE and PP were mixed with a Henschel mixer and a sufficient amount of pentaerythrityl-tetrakis-[3-(3,5-di-t-butyl-4-hydroxyphenyl)propionate] was added and premixed as an antioxidant. The obtained mixture was supplied through a feeder to the feed port of a twin-screw codirectional extruder. Liquid paraffin was also added into the twin-screw extruder cylinder through a side feeder in two portions, so that the quantity ratio of liquid paraffin (LP) in the total mixture to be melt kneaded and extruded (100.1 parts by weight) was 75.0 parts by weight. The preset temperature was 160° C. in the kneading unit and 200° C. in the T-die. The melt kneaded mixture was then extruded through a T-die into a sheet form and cooled with a cooling roll controlled to a surface temperature of 70° C., to obtain a cast sheet with a thickness of 1100 μm.

The obtained cast sheet was fed into a simultaneous biaxial stretcher to obtain a primary stretched membrane (primary stretching step). The set stretching conditions were an MD stretch ratio of 7, a TD stretch ratio of 7 and a stretching temperature of 118° C. for both the MD and TD. The obtained primary stretched membrane was then fed into a methylene chloride tank and thoroughly immersed, the liquid paraffin plasticizer was removed by extraction, and the methylene chloride was removed by drying, to obtain an extracted membrane.

Figure 2:
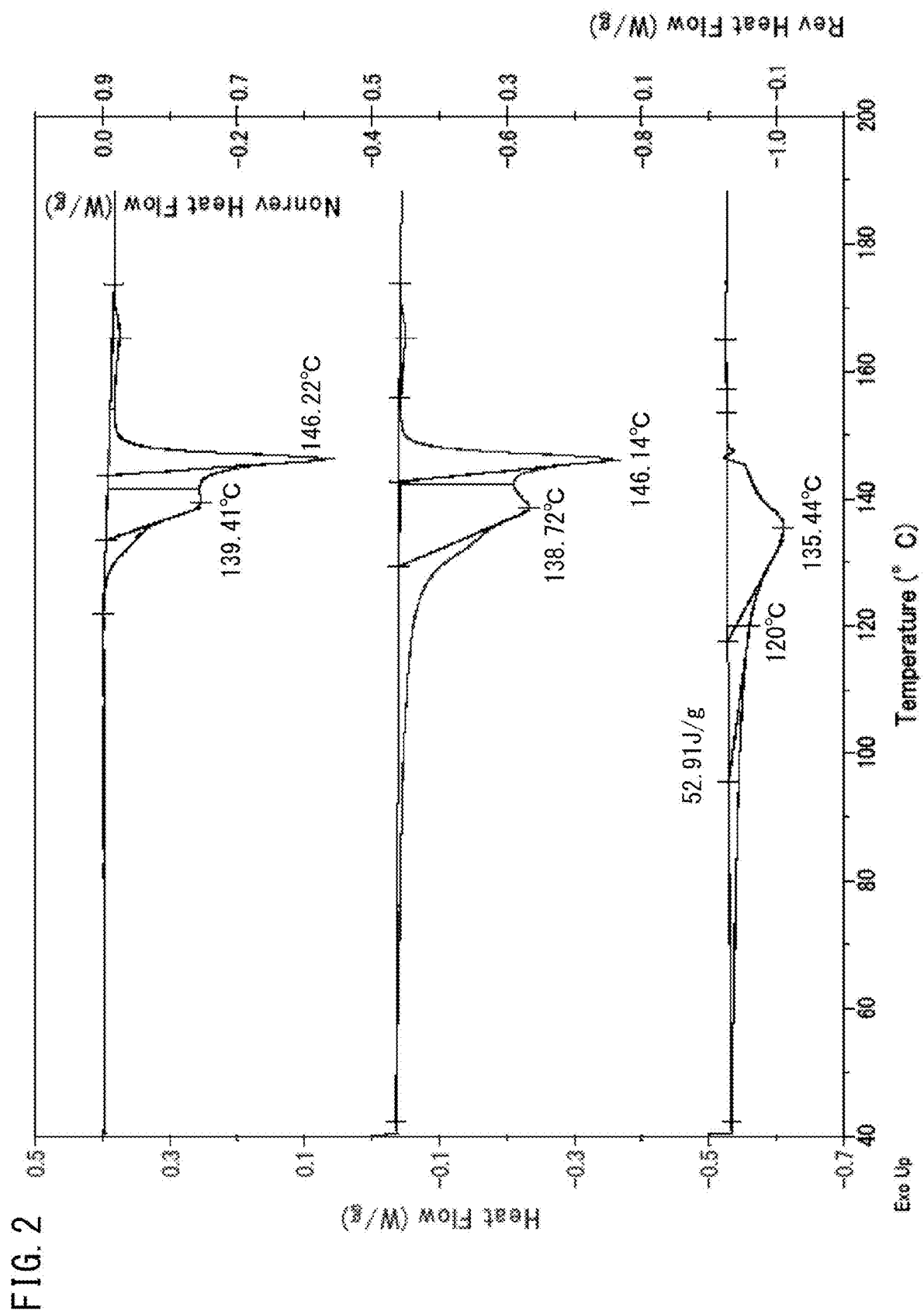
FIG. 2 is a graph showing measurement results by temperature modulated DSC for Example 1.

The extracted membrane to be heat set was fed to a TD-axis tenter. As the heat setting step, a stretching procedure was carried out under conditions with a TD stretching temperature of 130° C. and a TD stretch ratio of 2.00, after which a relaxation procedure was carried out under conditions with a relaxation temperature of 132° C. and a relaxation ratio of 0.80. The properties of the obtained PO microporous membrane were evaluated by the method described above. The membrane-forming conditions are shown in Table 2, and the results are shown in Table 4. FIG. 2 is a schematic diagram showing the measurement results for temperature modulated DSC of the obtained PO microporous membrane.

Examples 2 to 44 and Comparative Examples 1 to 11

Figure 3:
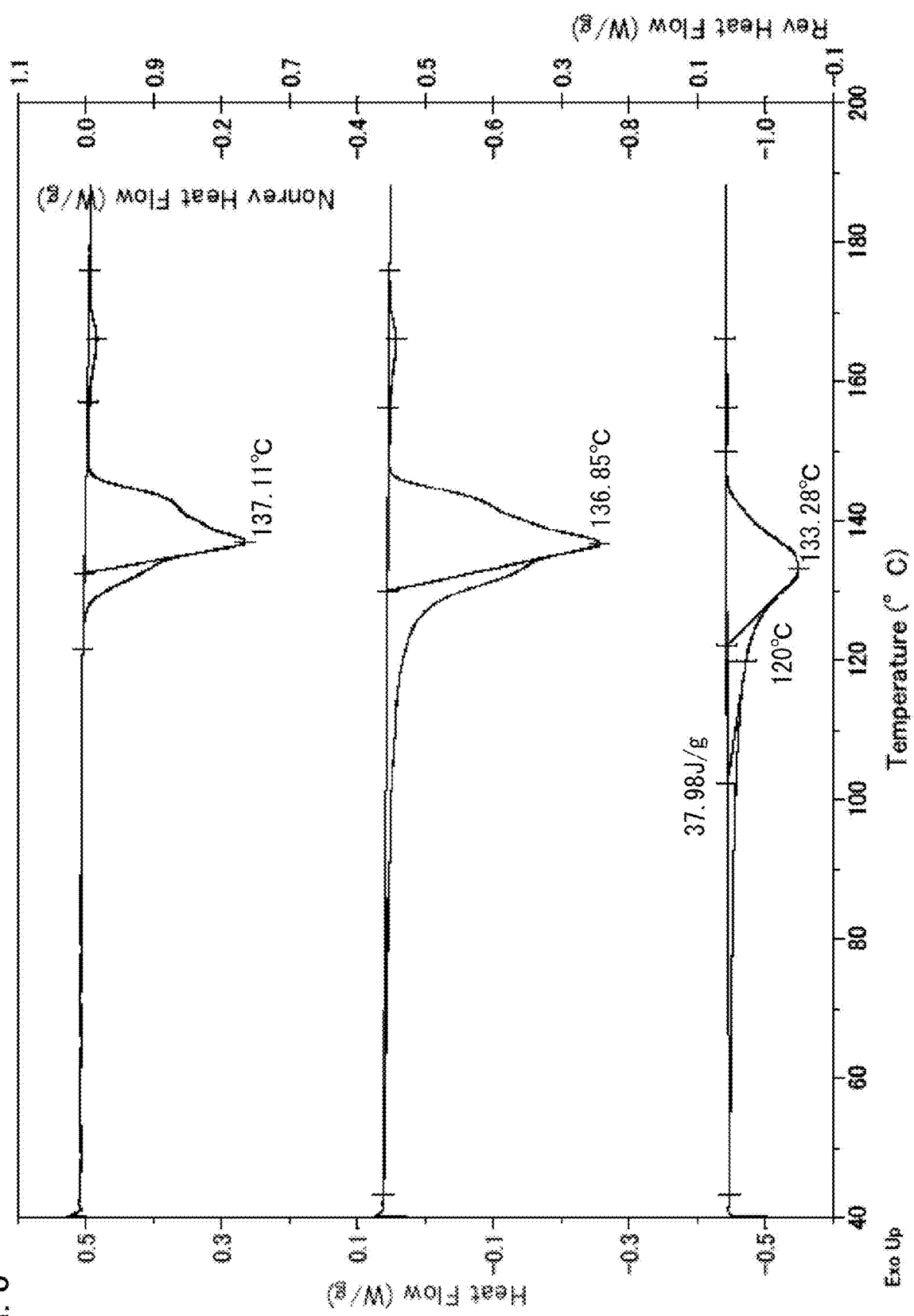
FIG. 3 is a graph showing measurement results by temperature modulated DSC for Comparative Example 9.

A PO microporous membrane was obtained in the same manner as Example 1, except that the type of starting material, starting material composition ratio, sheet thickness, stretching step conditions, heat setting step conditions and total stretch ratio were set as shown in Table 2 or Table 3, respectively. The properties of the obtained PO microporous membrane were evaluated by the method described above. The results are shown in Table 4 and Table 5. FIG. 3 is a schematic diagram showing the measurement results for temperature modulated DSC of the PO microporous membrane obtained in Comparative Example 9.

Example 45

The surface of the polyolefin microporous membrane of Example 1 was subjected to corona discharge treatment. As shown in Table 2, 95.0 parts by weight of aluminum hydroxide oxide (boehmite, block-shaped, D50=0.70 μm), 4.0 parts by solid weight of an acrylic latex (solid concentration: 40%, mean particle size: 145 nm), and 0.8 part by solid weight of an aqueous ammonium polycarboxylate solution (SN dispersant 5468 by San Nopco, Ltd.) were homogeneously dispersed in 100 parts by weight of water to obtain a coating solution, and after using a gravure coater to coat the coating solution onto the treated surface of the polyolefin microporous membrane, it was dried at 60° C. to remove the water and a porous layer with a coating thickness of 2 μm and a porosity of 50% was formed on one side of the polyolefin microporous membrane, to obtain a multilayer porous membrane. The obtained multilayer porous membrane had a total thickness of 7.5 μm, an air permeability of 130 sec/100 $cm^3$ and a heat shrinkage factor of 2.0%/1.5% at 120° C. Table 7 shows the evaluation results for batteries comprising multilayer porous membranes as separators.

Examples 46 to 48

Multilayer porous membranes were obtained in the same manner as Example 45, except that the polyolefin microporous membranes used as the base materials and the particle sizes of the fillers used were set as shown in Table 6. The properties of the obtained multilayer porous membranes were evaluated by the methods described above. The results are shown in Table 7.

TABLE 1-1

| | PE1 | PE2 | PE3 | PE4 | PE5 | PE6 | PE7 | PE8 | PE9 | PE10 | PE11 | PE12 | PP1 |
|---|---|---|---|---|---|---|---|---|---|---|---|---|---|
| Mv (10,000) | 25 | 50 | 70 | 88 | 88 | 100 | 150 | 200 | 88 | 150 | 28 | 250 | 40 |
| Mw/Mn (light scattering - absolute method) | 4 | 4.3 | 4.5 | 7.5 | 6.8 | 7.6 | 4.8 | 4.6 | 4.8 | 8.5 | 4.3 | 6.1 | 4.5 |
| Mz/Mw (light scattering - absolute method) | 2.9 | 3 | 2.9 | 5.2 | 3.6 | 4.8 | 3.1 | 3.1 | 3.1 | 6.1 | 3 | 3.8 | 2.8 |

TABLE 1-2

| | PE13 | PE14 | PE15 | PE16 | PE17 | PE18 | PE19 | PE20 |
|---|---|---|---|---|---|---|---|---|
| Mv (10,000) | 25 | 30 | 34 | 35 | 49 | 70 | 73 | 85 |
| Mw/Mn | 8.7 | 8.7 | 8.8 | 8.9 | 8.6 | 11 | 9.5 | 7.8 |
| Density (g/$cm^3$) | 0.950 | 0.950 | 0.949 | 0.945 | 0.943 | 0.942 | 0.941 | 0.940 |

| | PE21 | PE22 | PE23 | PE24 | PE25 | PE26 | PE27 |
|---|---|---|---|---|---|---|---|
| Mv (10,000) | 87 | 88 | 89 | 95 | 198 | 215 | 250 |
| Mw/Mn | 8.7 | 10.8 | 15.6 | 9.8 | 9.7 | 12.1 | 11.2 |
| Density (g/$cm^3$) | 0.939 | 0.942 | 0.933 | 0.934 | 0.931 | 0.930 | 0.931 |

TABLE 2-1

| Membrane-forming conditions | | | Example 1 | Example 2 | Example 3 | Example 4 | Example 5 | Example 6 | Example 7 |
|---|---|---|---|---|---|---|---|---|---|
| | PE (1) | | PE4 | PE4 | PE4 | PE4 | PE4 | PE4 | PE4 |
| | PE (2) | | — | — | — | — | — | — | — |
| | PP | | PP1 | PP1 | PP1 | PP1 | PP1 | PP1 | PP1 |
| | Plasticizer | — | LP | LP | LP | LP | LP | LP | LP |
| Starting compositional ratio | PE (1) | wt % | 23.3 | 23.3 | 23.3 | 23.3 | 23.3 | 23.3 | 23.3 |
| | PE (2) | wt % | — | — | — | — | — | — | — |
| | PP | wt % | 1.8 | 1.8 | 1.8 | 1.8 | 1.8 | 1.8 | 1.8 |
| | Plasticizer | wt % | 75.0 | 75.0 | 75.0 | 75.0 | 75.0 | 75.0 | 75.0 |
| Sheet thickness | | μm | 1100 | 1100 | 1100 | 1100 | 2000 | 900 | 1100 |
| Stretching | Longitudinal stretch ratio | Factor | 7 | 7 | 7 | 7 | 7 | 7 | 7 |
| | Longitudinal stretch temperature | °C. | 118 | 118 | 118 | 118 | 118 | 118 | 118 |
| | Transverse stretch ratio | Factor | 7 | 7 | 7 | 7 | 7 | 7 | 7 |
| | Transverse stretch temperature | °C. | 118 | 118 | 118 | 118 | 118 | 118 | 118 |
| | Stretching system | | Simultaneous | Simultaneous | Simultaneous | Simultaneous | Simultaneous | Simultaneous | Simultaneous |
| Heat setting | Transverse stretch ratio | Factor | 2.00 | 2.00 | 2.00 | 2.00 | 2.00 | 2.00 | 1.80 |
| | Transverse stretch temperature | °C. | 130 | 133 | 133 | 128 | 130 | 130 | 130 |
| | Relaxation ratio | Factor | 0.80 | 0.80 | 0.80 | 0.80 | 0.80 | 0.80 | 0.80 |
| | Relaxation temperature | °C. | 132 | 134 | 136 | 130 | 132 | 132 | 132 |
| Overall stretch ratio | | Factor | 78 | 78 | 78 | 78 | 78 | 78 | 71 |

TABLE 2-2

| Membrane-forming conditions | | | Example 8 | Example 9 | Example 10 | Example 11 | Example 12 | Example 13 | Example 14 |
|---|---|---|---|---|---|---|---|---|---|
| | PE (1) | | PE4 | PE4 | PE4 | PE4 | PE6 | PE3 | PE2 |
| | PE (2) | | — | — | — | — | — | — | — |
| | PP | | PP1 | PP1 | PP1 | PP1 | PP1 | PP1 | PP1 |
| | Plasticizer | — | LP | LP | LP | LP | LP | LP | LP |
| Starting compositional ratio | PE (1) | wt % | 23.3 | 23.3 | 23.3 | 23.3 | 23.3 | 23.3 | 23.3 |
| | PE (2) | wt % | — | — | — | — | — | — | — |
| | PP | wt % | 1.8 | 1.8 | 1.8 | 1.8 | 1.8 | 1.8 | 1.8 |
| | Plasticizer | wt % | 75.0 | 75.0 | 75.0 | 75.0 | 75.0 | 75.0 | 75.0 |
| Sheet thickness | | μm | 1100 | 1100 | 1100 | 1100 | 1100 | 1100 | 1100 |
| Stretching | Longitudinal stretch ratio | Factor | 7 | 7 | 7 | 7 | 7 | 7 | 7 |
| | Longitudinal stretch temperature | °C. | 118 | 118 | 122 | 116 | 118 | 118 | 118 |
| | Transverse stretch ratio | Factor | 7 | 7 | 7 | 7 | 7 | 7 | 7 |
| | Transverse stretch temperature | °C. | 118 | 118 | 122 | 116 | 118 | 118 | 118 |
| | Stretching system | | Simultaneous | Simultaneous | Simultaneous | Simultaneous | Simultaneous | Simultaneous | Simultaneous |
| Heat setting | Transverse stretch ratio | Factor | 2.00 | 2.00 | 2.00 | 2.00 | 2.00 | 2.00 | 2.00 |
| | Transverse stretch temperature | °C. | 130 | 130 | 130 | 130 | 131 | 129 | 128 |
| | Relaxation ratio | Factor | 0.90 | 0.70 | 0.80 | 0.80 | 0.80 | 0.80 | 0.80 |

TABLE 2-2-continued

| Membrane-forming conditions | | | Example 8 | Example 9 | Example 10 | Example 11 | Example 12 | Example 13 | Example 14 |
|---|---|---|---|---|---|---|---|---|---|
| | Relaxation temperature | ° C. | 132 | 132 | 132 | 132 | 133 | 131 | 130 |
| Overall stretch ratio | | Factor | 88 | 69 | 78 | 78 | 78 | 78 | 78 |

TABLE 2-3

| Membrane-forming conditions | | | Example 15 | Example 16 | Example 17 | Example 18 | Example 19 | Example 20 | Example 21 |
|---|---|---|---|---|---|---|---|---|---|
| | PE (1) | | PE4 | PE4 | PE4 | PE4 | PE4 | PE5 | PE4 |
| | PE (2) | | — | PE1 | PE1 | PE1 | PE1 | — | — |
| | PP | | — | — | — | — | PP1 | PP1 | PP1 |
| | Plasticizer | — | LP | LP | LP | LP | LP | LP | LP |
| Starting compositional ratio | PE (1) | wt % | 25.0 | 17.5 | 13.8 | 7.5 | 16.2 | 23.3 | 23.3 |
| | PE (2) | wt % | — | 7.5 | 11.3 | 17.5 | 7.0 | — | — |
| | PP | wt % | — | — | — | — | 1.8 | 1.8 | 1.8 |
| | Plasticizer | wt % | 75.0 | 75.0 | 75.0 | 75.0 | 75.0 | 75.0 | 75.0 |
| Sheet thickness | | μm | 1100 | 1100 | 1100 | 1100 | 1100 | 1100 | 1100 |
| Stretching | Longitudinal stretch ratio | Factor | 7 | 7 | 7 | 7 | 7 | 7 | 7 |
| | Longitudinal stretch temperature | ° C. | 118 | 118 | 118 | 118 | 118 | 118 | 118 |
| | Transverse stretch ratio | Factor | 7 | 7 | 7 | 7 | 7 | 7 | 7 |
| | Transverse stretch temperature | ° C. | 118 | 118 | 118 | 118 | 118 | 118 | 118 |
| | Stretching system | | Simultaneous | Simultaneous | Simultaneous | Simultaneous | Simultaneous | Simultaneous | Sequential |
| Heat setting | Transverse stretch ratio | Factor | 2.00 | 2.00 | 2.00 | 2.00 | 2.00 | 2.00 | 2.00 |
| | Transverse stretch temperature | ° C. | 130 | 130 | 130 | 130 | 130 | 130 | 130 |
| | Relaxation ratio | Factor | 0.80 | 0.80 | 0.80 | 0.80 | 0.80 | 0.80 | 0.80 |
| | Relaxation temperature | ° C. | 132 | 132 | 132 | 130 | 130 | 131 | 132 |
| Overall stretch ratio | | Factor | 78 | 78 | 78 | 78 | 78 | 78 | 78 |

TABLE 2-4

| Membrane-forming conditions | | | Example 22 | Example 23 | Example 24 | Example 25 | Example 26 | Example 27 | Example 28 |
|---|---|---|---|---|---|---|---|---|---|
| | PE (1) | | PE7 | PE4 | PE4 | PE4 | PE9 | PE10 | PE3 |
| | PE (2) | | — | PE1 | PE1 | PE1 | — | PE1 | — |
| | PP | | PP1 | — | — | — | PP1 | — | PP1 |
| | Plasticizer | — | LP | LP | LP | LP | LP | LP | LP |
| Starting compositional ratio | PE (1) | wt % | 18.6 | 17.5 | 17.5 | 17.5 | 23.3 | 17.5 | 23.3 |
| | PE (2) | wt % | — | 7.5 | 7.5 | 7.5 | — | 7.5 | — |
| | PP | wt % | 1.4 | — | — | — | 1.8 | — | 1.8 |
| | Plasticizer | wt % | 80.0 | 75.0 | 75.0 | 75.0 | 75.0 | 75.0 | 75.0 |
| Sheet thickness | | μm | 1400 | 1100 | 1800 | 1100 | 1100 | 1100 | 1100 |
| Stretching | Longitudinal stretch ratio | Factor | 7 | 7 | 7 | 7 | 7 | 7 | 7 |
| | Longitudinal stretch temperature | ° C. | 118 | 120 | 120 | 121 | 118 | 122 | 120 |
| | Transverse stretch ratio | Factor | 7 | 7 | 7 | 7 | 7 | 7 | 7 |

TABLE 2-4-continued

| Membrane-forming conditions | | | Example 22 | Example 23 | Example 24 | Example 25 | Example 26 | Example 27 | Example 28 |
|---|---|---|---|---|---|---|---|---|---|
| | Transverse stretch temperature | °C. | 118 | 120 | 120 | 121 | 118 | 122 | 120 |
| | Stretching system | | Simultaneous | Simultaneous | Simultaneous | Simultaneous | Simultaneous | Simultaneous | Sequential |
| Heat setting | Transverse stretch ratio | Factor | 2.00 | 2.00 | 2.00 | 2.00 | 2.00 | 2.00 | 2.00 |
| | Transverse stretch temperature | °C. | 132 | 130 | 128 | 130 | 130 | 132 | 130 |
| | Relaxation ratio | Factor | 0.80 | 0.80 | 0.80 | 0.80 | 0.80 | 0.80 | 0.80 |
| | Relaxation temperature | °C. | 134 | 132 | 129 | 132 | 130 | 134 | 132 |
| Overall stretch ratio | | Factor | 78 | 78 | 78 | 78 | 78 | 78 | 78 |

TABLE 2-5

| Membrane-forming conditions | | | Example 29 | Example 30 | Example 31 | Example 32 | Example 33 | Example 34 | Example 35 | Example 36 |
|---|---|---|---|---|---|---|---|---|---|---|
| | PE (1) | | PE21 | PE19 | PE21 | PE21 | PE21 | PE7 | PE21 | PE21 |
| | PE (2) | | — | — | — | — | — | — | PE19 | PE19 |
| | PP | Mv (10,000) | 40 | 40 | 40 | 40 | 40 | 40 | 40 | 40 |
| | Plasticizer | — | LP | LP | LP | LP | LP | LP | LP | LP |
| Starting compositional ratio | PE (1) | wt % | 23.3 | 25.7 | 23.3 | 23.8 | 23.8 | 24.2 | 11.8 | 11.8 |
| | PE (2) | wt % | — | — | — | — | — | — | 11.8 | 11.8 |
| | PP | wt % | 1.8 | 1.4 | 1.8 | 1.3 | 1.3 | 1.8 | 1.5 | 1.5 |
| | Plasticizer | wt % | 75.0 | 73.0 | 75.0 | 75.0 | 75.0 | 74.0 | 75.0 | 75.0 |
| Sheet thickness | | μm | 820 | 790 | 800 | 780 | 830 | 900 | 930 | 830 |
| Stretching | Longitudinal stretch ratio | Factor | 7 | 7 | 7 | 7 | 7 | 7 | 7 | 7 |
| | Longitudinal stretch temperature | °C. | 118 | 117 | 118 | 118 | 118 | 119 | 117 | 118 |
| | Transverse stretch ratio | Factor | 7 | 7 | 7 | 7 | 6.7 | 7 | 6.5 | 7 |
| | Transverse stretch temperature | °C. | 118 | 117 | 118 | 118 | 118 | 119 | 117 | 118 |
| | Stretching system | | Simultaneous | Simultaneous | Simultaneous | Simultaneous | Simultaneous | Simultaneous | Simultaneous | Simultaneous |
| Heat setting | Transverse stretch ratio | Factor | 2.00 | 1.80 | 1.80 | 1.70 | 1.88 | 1.72 | 1.90 | 1.88 |
| | Transverse stretch temperature | °C. | 132 | 129 | 131 | 130 | 131 | 128 | 131 | 131 |
| | Relaxation ratio | Factor | 0.80 | 0.88 | 0.86 | 0.84 | 0.89 | 0.86 | 0.72 | 0.86 |
| | Relaxation temperature | °C. | 135 | 132 | 134 | 133 | 134 | 133 | 133 | 135 |
| Overall stretch ratio | | Factor | 78 | 78 | 76 | 70 | 78 | 72 | 62 | 79 |

TABLE 2-6

| Membrane-forming conditions | | | Example 37 | Example 38 | Example 39 | Example 40 |
|---|---|---|---|---|---|---|
| | PE (1) | | PE12 | PE19 | PE19 | PE24 |
| | PE (2) | | — | PE17 | — | — |
| | PP | Mv (10,000) | 40 | — | — | — |
| | Plasticizer | — | LP | LP | LP | LP |

TABLE 2-6-continued

| | Membrane-forming conditions | | | | | |
|---|---|---|---|---|---|---|
| Starting compositional ratio | PE (1) | wt % | 22.3 | 14.0 | 25.0 | 23.0 |
| | PE (2) | wt % | — | 14.0 | — | — |
| | PP | wt % | 0.7 | — | — | — |
| | Plasticizer | wt % | 77.0 | 72.0 | 75.0 | 77.0 |
| | Sheet thickness | μm | 810 | 1020 | 810 | 890 |
| Stretching | Longitudinal stretch ratio | Factor | 7 | 6 | 7 | 7 |
| | Longitudinal stretch temperature | ° C. | 119 | 118 | 118 | 118 |
| | Transverse stretch ratio | Factor | 7.5 | 6.2 | 7 | 7 |
| | Transverse stretch temperature | ° C. | 119 | 118 | 118 | 118 |
| | Stretching system | | Simultaneous | Simultaneous | Simultaneous | Simultaneous |
| Heat setting | Transverse stretch ratio | Factor | 1.75 | 1.73 | 1.78 | 1.80 |
| | Transverse stretch temperature | ° C. | 131 | 130 | 131 | 131 |
| | Relaxation ratio | Factor | 0.85 | 0.81 | 0.85 | 0.85 |
| | Relaxation temperature | ° C. | 134 | 134 | 134 | 134 |
| | Overall stretch ratio | Factor | 78 | 52 | 74 | 75 |

| | Membrane-forming conditions | | Example 41 | Example 42 | Example 43 | Example 44 |
|---|---|---|---|---|---|---|
| | PE (1) | | PE21 | PE20 | PE21 | PE21 |
| | PE (2) | | — | — | — | PE25 |
| | PP | Mv (10,000) | 40 | — | 40 | 40 |
| | Plasticizer | — | LP | LP | LP | LP |
| Starting compositional ratio | PE (1) | wt % | 22.8 | 24.0 | 23.0 | 14.5 |
| | PE (2) | wt % | — | — | — | 6.9 |
| | PP | wt % | 1.2 | — | 4.1 | 1.6 |
| | Plasticizer | wt % | 76.0 | 76.0 | 73.0 | 77.0 |
| | Sheet thickness | μm | 900 | 880 | 830 | 820 |
| Stretching | Longitudinal stretch ratio | Factor | 7 | 7 | 7 | 7 |
| | Longitudinal stretch temperature | ° C. | 117 | 118 | 118 | 118 |
| | Transverse stretch ratio | Factor | 7 | 7.3 | 6.5 | 7 |
| | Transverse stretch temperature | ° C. | 117 | 118 | 118 | 118 |
| | Stretching system | | Simultaneous | Simultaneous | Simultaneous | Simultaneous |
| Heat setting | Transverse stretch ratio | Factor | 1.90 | 1.82 | 1.81 | 1.90 |
| | Transverse stretch temperature | ° C. | 133 | 130 | 131 | 131 |
| | Relaxation ratio | Factor | 0.85 | 0.85 | 0.88 | 0.85 |
| | Relaxation temperature | ° C. | 135 | 134 | 134 | 135 |
| | Overall stretch ratio | Factor | 79 | 79 | 72 | 79 |

TABLE 3-1

| | Membrane-forming conditions | | Comparative Example 1 | Comparative Example 2 | Comparative Example 3 | Comparative Example 4 | Comparative Example 5 | Comparative Example 6 |
|---|---|---|---|---|---|---|---|---|
| | PE (1) | | PE4 | PE4 | PE4 | PE4 | PE8 | PE6 |
| | PE (2) | | — | — | — | — | PE1 | PE2 |
| | PP | Mv (10,000) | PP1 | PP1 | PP1 | PP1 | — | — |
| | Plasticizer | — | LP | LP | LP | LP | LP | LP |
| Starting compositional ratio | PE1 | wt % | 23.3 | 23.3 | 23.3 | 23.3 | 20.0 | 3.0 |
| | PE2 | wt % | — | — | — | — | 20.0 | 17.0 |
| | PP | wt % | 1.8 | 1.8 | 1.8 | 1.8 | — | — |
| | Plasticizer | wt % | 75.0 | 75.0 | 75.0 | 75.0 | 60.0 | 80.0 |
| | Sheet thickness | μm | 790 | 1000 | 790 | 790 | 1500 | 900 |
| Stretching | Longitudinal stretch ratio | Factor | 5 | 10 | 7 | 7 | 7 | 6 |
| | Longitudinal stretch temperature | ° C. | 118 | 118 | 118 | 124 | 122 | 115 |
| | Transverse stretch ratio | Factor | 5 | 10 | 7 | 7 | 7 | 6 |
| | Transverse stretch temperature | ° C. | 118 | 118 | 118 | 124 | 122 | 115 |
| | Stretching system | | Simultaneous | Simultaneous | Simultaneous | Simultaneous | Simultaneous | Simultaneous |

TABLE 3-1-continued

| Membrane-forming conditions | | | Comparative Example 1 | Comparative Example 2 | Comparative Example 3 | Comparative Example 4 | Comparative Example 5 | Comparative Example 6 |
|---|---|---|---|---|---|---|---|---|
| Heat setting | Transverse stretch ratio | Factor | 2.00 | 2.00 | 1.48 | 2.00 | 1.20 | — |
| | Transverse stretch temperature | °C. | 130 | 130 | 130 | 130 | 115 | — |
| | Relaxation ratio | Factor | 0.80 | 0.80 | 0.80 | 0.80 | 0.92 | — |
| | Relaxation temperature | °C. | 132 | 132 | 132 | 132 | 115 | — |
| Overall stretch ratio | | Factor | 40 | 160 | 58 | 78 | 54 | 36 |

TABLE 3-2

| Membrane-forming conditions | | | Comparative Example 7 | Comparative Example 8 | Comparative Example 9 | Comparative Example 10 | Comparative Example 11 |
|---|---|---|---|---|---|---|---|
| | PE (1) | | PE3 | PE8 | PE3 | PE4 | PE11 |
| | PE (2) | | — | — | PE1 | — | PE12 |
| | PP | Mv (10,000) | PP1 | PP1 | PP1 | PP1 | — |
| | Plasticizer | | LP | LP | LP | LP | LP |
| Starting compositional ratio | PE1 | wt % | 23.3 | 23.3 | 14.0 | 23.3 | 20.0 |
| | PE2 | wt % | — | — | 14.0 | — | 5.0 |
| | PP | wt % | 1.8 | 1.8 | 2.1 | 1.8 | — |
| | Plasticizer | wt % | 75.0 | 75.0 | 70.0 | 75.0 | 75.0 |
| | Sheet thickness | μm | 790 | 790 | 700 | 1100 | 2200 |
| Stretching | Longitudinal stretch ratio | Factor | 7 | 7 | 7 | 7 | 7 |
| | Longitudinal stretch temperature | °C. | 118 | 118 | 118 | 120 | 108 |
| | Transverse stretch ratio | Factor | 7 | 7 | 7 | 7 | 7.5 |
| | Transverse stretch temperature | °C. | 120 | 118 | 118 | 120 | 120 |
| | Stretching system | | Sequential | Simultaneous | Simultaneous | Sequential | Sequential |
| Heat setting | Transverse stretch ratio | Factor | 2.00 | 2.00 | 2.00 | 2.00 | 2.00 |
| | Transverse stretch temperature | °C. | 130 | 133 | 129 | 130 | 130 |
| | Relaxation ratio | Factor | 0.80 | 0.80 | 0.80 | 0.80 | 0.94 |
| | Relaxation temperature | °C. | 132 | 135 | 129 | 132 | 130 |
| Overall stretch ratio | | Factor | 78 | 78 | 78 | 78 | 99 |

TABLE 4.1

| Microporous membrane properties | | | Example 1 | Example 2 | Example 3 | Example 4 | Example 5 | Example 6 | Example 7 |
|---|---|---|---|---|---|---|---|---|---|
| Viscosity-average molecular weight | | ×10,000 | 81 | 81 | 81 | 81 | 81 | 81 | 81 |
| Membrane thickness | | μm | 5.5 | 5.1 | 4.7 | 5.9 | 12 | 4 | 5.5 |
| Porosity | | % | 38 | 33 | 30 | 42 | 45 | 35 | 38 |
| Air permeability | | s/100 cm$^3$ | 120 | 160 | 180 | 80 | 160 | 90 | 130 |
| Puncture strength | | gf | 377 | 375 | 360 | 380 | 630 | 310 | 350 |
| Basis weight-equivalent puncture strength | | gf/(g/m$^2$) | 116 | 116 | 115 | 117 | 100 | 130 | 108 |
| Pore size | | μm | 0.035 | 0.038 | 0.039 | 0.030 | 0.038 | 0.030 | 0.032 |
| Shutdown temperature | | °C. | 148.5 | 147.5 | 147.0 | 149.0 | 146.7 | 149.1 | 147.5 |
| TMA Maximum shrinkage stress (MD) | | gf | 2.8 | 2.8 | 2.6 | 2.8 | 4.7 | 2.5 | 2.6 |
| TMA Maximum shrinkage stress (TD) | | gf | 2.6 | 2.6 | 2.5 | 2.6 | 4.4 | 2.2 | 2.4 |
| MD heat shrinkage factor at 120° C. | | % | 14.5 | 9.8 | 9.0 | 16.8 | 15.0 | 9.5 | 8.0 |
| TD heat shrinkage factor at 120° C. | | % | 14.8 | 9.5 | 7.5 | 19.5 | 15.6 | 6.8 | 8.0 |
| Temperature modulated DSC Nonrev. | Low-temperature end peak temperature | °C. | 139.4 | 139 | 138.8 | 139.4 | 138.8 | 139.5 | 139.4 |
| | High-temperature end peak temperature | °C. | 146.2 | 146.2 | 146.1 | 146.3 | 145.1 | 146.9 | 145.2 |
| | Temperature of maximum endothermic peak | °C. | 146.2 | 146.2 | 146.1 | 146.3 | 145.1 | 146.9 | 145.2 |
| Temperature modulated DSC Rev. | Quantity of heat to 120° C. | J/g | 52.9 | 50.6 | 48.5 | 57.5 | 53 | 54.1 | 52.9 |
| | Peak temperature | °C. | 135.4 | 135.6 | 135.6 | 135.3 | 136 | 135.2 | 135.1 |

TABLE 4.1-continued

| Microporous membrane properties | | | Example 1 | Example 2 | Example 3 | Example 4 | Example 5 | Example 6 | Example 7 |
|---|---|---|---|---|---|---|---|---|---|
| Output test | Output characteristic value (5 C capacity/1 C capacity) | — | 0.92 | 0.80 | 0.72 | 0.95 | 0.97 | 0.84 | 0.92 |
| | Assessment | | A | B | C | A | A | B | A |
| Cycle test | Capacity retention | % | 92 | 89 | 88 | 96 | 90 | 96 | 95 |
| | Assessment | — | A | B | B | A | A | A | A |
| Oven test (150° C.) | Time to ignition | min | 51 | >60 | >60 | 33 | 42 | >60 | >60 |
| | Assessment | — | B | A | A | B | B | A | A |
| Impact test | Cell temperature (maximum of N = 5) | ° C. | 28 | 28 | 30 | 27 | 30 | 25 | 37 |
| | Assessment | — | A | A | A | A | A | A | B |

TABLE 4-2

| Microporous membrane properties | | | Example 8 | Example 9 | Example 10 | Example 11 | Example 12 | Example 13 | Example 14 |
|---|---|---|---|---|---|---|---|---|---|
| Viscosity-average molecular weight | | ×10,000 | 81 | 81 | 81 | 81 | 91 | 65 | 45 |
| Membrane thickness | | μm | 5.5 | 5.5 | 5.2 | 5.5 | 5.5 | 5.5 | 5.5 |
| Porosity | | % | 40 | 37 | 35 | 40 | 38 | 38 | 38 |
| Air permeability | | s/100 cm³ | 100 | 160 | 110 | 130 | 125 | 120 | 115 |
| Puncture strength | | gf | 380 | 360 | 292 | 388 | 415 | 352 | 271 |
| Basis weight-equivalent puncture strength | | gf/(g/m²) | 121 | 109 | 91 | 124 | 128 | 109 | 84 |
| Pore size | | μm | 0.038 | 0.032 | 0.038 | 0.034 | 0.030 | 0.040 | 0.042 |
| Shutdown temperature | | ° C. | 148.9 | 147.8 | 145.1 | 149.2 | 149.2 | 146.5 | 142.0 |
| TMA Maximum shrinkage stress (MD) | | gf | 2.9 | 2.7 | 2.2 | 3.0 | 3.2 | 2.6 | 2.0 |
| TMA Maximum shrinkage stress (TD) | | gf | 2.6 | 2.5 | 2.0 | 2.7 | 3.0 | 2.4 | 1.9 |
| MD heat shrinkage factor at 120° C. | | % | 15.4 | 7.5 | 5.2 | 15.5 | 15.9 | 8.2 | 5.5 |
| TD heat shrinkage factor at 120° C. | | % | 19.5 | 6.8 | 4.8 | 15.8 | 15.6 | 9.4 | 5.2 |
| Temperature modulated DSC Nonrev. | Low-temperature end peak temperature | ° C. | 139.4 | 138.8 | 138.5 | 139.9 | 138.9 | 138.8 | 138.2 |
| | High-temperature end peak temperature | ° C. | 146.2 | 146.4 | 144.5 | 146.5 | 147.1 | 143.1 | 141.9 |
| | Temperature of maximum endothermic peak | ° C. | 146.2 | 146.4 | 144.5 | 146.5 | 147.1 | 143.1 | 138.2 |
| Temperature modulated DSC Rev. | Quantity of heat to 120° C. | J/g | 58.9 | 52.9 | 51.8 | 54.5 | 59.5 | 50.2 | 44.1 |
| | Peak temperature | ° C. | 135 | 135.4 | 135.5 | 136.2 | 136.5 | 135.1 | 135.4 |
| Output test | Output characteristic value (5 C capacity/1 C capacity) | — | 0.94 | 0.89 | 0.84 | 0.96 | 0.92 | 0.92 | 0.92 |
| | Assessment | | A | B | A | A | A | A | A |
| Cycle test | Capacity retention | % | 90 | 94 | 90 | 93 | 96 | 90 | 86 |
| | Assessment | — | A | A | A | A | A | A | B |
| Oven test (150° C.) | Time to ignition | min | 42 | >60 | >60 | 41 | 41 | >60 | >60 |
| | Assessment | — | B | A | A | B | B | A | A |
| Impact test | Cell temperature (maximum of N = 5) | ° C. | 29 | 31 | 50 | 26 | 26 | 83 | 98 |
| | Assessment | — | A | B | B | A | A | B | B |

TABLE 4-3

| Microporous membrane properties | | | Example 15 | Example 16 | Example 17 | Example 18 | Example 19 | Example 20 | Example 21 |
|---|---|---|---|---|---|---|---|---|---|
| Viscosity-average molecular weight | | ×10,000 | 85 | 65 | 57 | 42 | 65 | 81 | 81 |
| Membrane thickness | | μm | 5.5 | 5.5 | 5.5 | 5.5 | 5.5 | 5.5 | 5.5 |
| Porosity | | % | 38 | 38 | 38 | 38 | 38 | 38 | 38 |
| Air permeability | | s/100 cm³ | 135 | 120 | 115 | 110 | 121 | 120 | 100 |
| Puncture strength | | gf | 385 | 340 | 301 | 250 | 348 | 350 | 377 |
| Basis weight-equivalent puncture strength | | gf/(g/m²) | 119 | 105 | 93 | 77 | 107 | 108 | 116 |
| Pore size | | μm | 0.037 | 0.038 | 0.039 | 0.041 | 0.038 | 0.035 | 0.045 |
| Shutdown temperature | | ° C. | 148.7 | 144.5 | 142.4 | 139.5 | 142.2 | 146.5 | 149.7 |
| TMA Maximum shrinkage stress (MD) | | gf | 2.9 | 2.7 | 2.2 | 1.9 | 2.7 | 2.7 | 2.9 |
| TMA Maximum shrinkage stress (TD) | | gf | 2.6 | 2.4 | 2.0 | 1.7 | 2.4 | 2.3 | 2.6 |
| MD heat shrinkage factor at 120° C. | | % | 12.0 | 9.9 | 8.5 | 7.5 | 9.3 | 14.8 | 12.0 |
| TD heat shrinkage factor at 120° C. | | % | 11.6 | 9.6 | 7.8 | 7.1 | 6.5 | 16.5 | 9.1 |

TABLE 4-3-continued

| Microporous membrane properties | | | Example 15 | Example 16 | Example 17 | Example 18 | Example 19 | Example 20 | Example 21 |
|---|---|---|---|---|---|---|---|---|---|
| Temperature modulated DSC Nonrev. | Low-temperature end peak temperature | °C. | 138.5 | 138.8 | 138.7 | 138.5 | 138.7 | 139.3 | 139.4 |
| | High-temperature end peak temperature | °C. | 146.9 | 146.7 | 145.2 | 143.2 | 145.9 | 145.1 | 143.5 |
| | Temperature of maximum endothermic peak | °C. | 146.9 | 146.7 | 145.2 | 138.5 | 145.9 | 145.1 | 139.4 |
| Temperature modulated DSC Rev. | Quantity of heat to 120° C. | J/g | 52.9 | 51 | 47.5 | 45.2 | 51.5 | 52.9 | 45.8 |
| | Peak temperature | °C. | 135.4 | 135.4 | 135.4 | 135.4 | 135.4 | 135.4 | 135.4 |
| Output test | Output characteristic value (5 C capacity/1 C capacity) | — | 0.92 | 0.92 | 0.92 | 0.92 | 0.92 | 0.92 | 0.92 |
| | Assessment | | A | A | A | A | A | A | A |
| Cycle test | Capacity retention | % | 91 | 90 | 90 | 86 | 90 | 92 | 83 |
| | Assessment | — | A | A | A | B | A | A | C |
| Oven test (150° C.) | Time to ignition | min | 54 | >60 | >60 | >60 | >60 | 39 | 54 |
| | Assessment | | B | A | A | A | A | B | A |
| Impact test | Cell temperature (maximum of N = 5) | °C. | 25 | 35 | 56 | 98 | 45 | 41 | 83 |
| | Assessment | — | A | B | B | B | B | B | B |

TABLE 4-4

| Microporous membrane properties | | Example 22 | Example 23 | Example 24 | Example 25 | Example 26 | Example 27 | Example 28 |
|---|---|---|---|---|---|---|---|---|
| Viscosity-average molecular weight | ×10,000 | 140 | 65 | 65 | 65 | 81 | 105 | 65 |
| Membrane thickness | μm | 5.5 | 5.5 | 9 | 5.5 | 5.5 | 5.5 | 5.5 |
| Porosity | % | 38 | 36 | 40 | 34 | 38 | 36 | 38 |
| Air permeability | s/100 cm$^3$ | 145 | 130 | 130 | 150 | 120 | 150 | 90 |
| Puncture strength | gf | 500 | 320 | 500 | 280 | 330 | 440 | 330 |
| Basis weight-equivalent puncture strength | gf/(g/m$^2$) | 154 | 96 | 97 | 81 | 102 | 132 | 102 |
| Pore size | μm | 0.029 | 0.043 | 0.041 | 0.043 | 0.037 | 0.031 | 0.051 |
| Shutdown temperature | °C. | 149.4 | 142.6 | 143.8 | 141.1 | 147.1 | 149.6 | 148.5 |
| TMA Maximum shrinkage stress (MD) | gf | 3.9 | 2.4 | 3.8 | 2.1 | 2.5 | 3.2 | 2.6 |
| TMA Maximum shrinkage stress (TD) | gf | 3.5 | 2.2 | 3.4 | 1.9 | 2.3 | 3.1 | 2.4 |
| MD heat shrinkage factor at 120° C. | % | 18.5 | 8.1 | 11.1 | 7.5 | 16.7 | 14.9 | 6.8 |
| TD heat shrinkage factor at 120° C. | % | 19.5 | 5.1 | 11.4 | 4.1 | 20.1 | 14.9 | 4.0 |
| Temperature modulated DSC Nonrev. | Low-temperature end peak temperature | °C. | 139.4 | 138.2 | 138.3 | 137.9 | 139.3 | 139.1 | 138.1 |
| | High-temperature end peak temperature | °C. | 148.5 | 144.1 | 144.1 | 142.1 | 143.5 | 146.2 | 141.5 |
| | Temperature of maximum endothermic peak | °C. | 148.5 | 144.1 | 144.1 | 142.1 | 143.5 | 146.2 | 138.1 |
| Temperature modulated DSC Rev. | Quantity of heat to 120° C. | J/g | 56 | 46.1 | 46.1 | 46.1 | 52.9 | 51.8 | 39.5 |
| | Peak temperature | °C. | 137 | 135.8 | 136 | 135.4 | 135.4 | 136.2 | 135.5 |

TABLE 4-4-continued

| Microporous membrane properties | | | Example 22 | Example 23 | Example 24 | Example 25 | Example 26 | Example 27 | Example 28 |
|---|---|---|---|---|---|---|---|---|---|
| Output test | Output characteristic value (5 C capacity/1 C capacity) | — | 0.92 | 0.87 | 0.94 | 0.82 | 0.92 | 0.87 | 0.92 |
| | Assessment | | A | B | A | B | A | B | A |
| Cycle test | Capacity retention | % | 97 | 87 | 88 | 85 | 90 | 97 | 80 |
| | Assessment | — | A | B | B | B | A | A | C |
| Oven test (150° C.) | Time to ignition | min | 33 | >60 | 39 | >60 | 29 | 45 | >60 |
| | Assessment | — | B | A | B | A | C | B | A |
| Impact test | Cell temperature (maximum of N = 5) | ° C. | 25 | 55 | 56 | 78 | 56 | 28 | 98 |
| | Assessment | — | A | B | B | B | B | A | B |

TABLE 4-5

| Microporous membrane properties | | | Example 29 | Example 30 | Example 31 | Example 32 |
|---|---|---|---|---|---|---|
| Membrane thickness | | μm | 4.1 | 4.5 | 4.8 | 4.9 |
| Porosity | | % | 37 | 41 | 36 | 37 |
| Air permeability | | s/100 cc | 115 | 95 | 128 | 131 |
| Puncture strength | | gf | 303 | 288 | 335 | 329 |
| Puncture strength | | gf/(gf/m²) | 123 | 114 | 115 | 112 |
| Microporous membrane melting point (2nd peak in DSC) | | ° C. | 136 | 136 | 136 | 136 |
| Pore size | | μm | 0.034 | 0.032 | 0.035 | 0.034 |
| TMA Maximum shrinkage stress (MD) | | gf | 2.4 | 2.4 | 2.7 | 2.7 |
| TMA Maximum shrinkage stress (TD) | | gf | 2.3 | 2.2 | 2.4 | 2.3 |
| MD heat shrinkage factor at 120° C. | | % | 12.1 | 13.1 | 11.4 | 11.8 |
| TD heat shrinkage factor at 120° C. | | % | 13.5 | 16.1 | 13.0 | 12.4 |
| MD heat shrinkage factor at 150° C. | | % | 66.4 | 65.7 | 68.9 | 67.1 |
| TD heat shrinkage factor at 150° C. | | % | 67.5 | 64.2 | 65.6 | 63.1 |
| Shutdown temperature | | ° C. | 149 | 145 | 148 | 147 |
| Membrane rupture temperature | | ° C. | 200< | 195 | 200< | 190 |
| Temperature modulated DSC Nonrev. | Low-temperature end peak temperature | ° C. | 139.4 | 139.1 | 138.9 | 138.5 |
| | High-temperature end peak temperature | ° C. | 146.7 | 146.3 | 146.5 | 145.8 |
| | Temperature of maximum endothermic peak | ° C. | 146.7 | 146.3 | 146.5 | 145.8 |
| Temperature modulated DSC Rev. | Quantity of heat to 120° C. | J/g | 53.1 | 57.5 | 52.5 | 52.5 |
| | Peak temperature | ° C. | 135.4 | 135.3 | 135.1 | 135.6 |
| Output test | Output characteristic value (5 C capacity/1 C capacity) | — | 0.91 | 0.96 | 0.91 | 0.91 |
| | Assessment | | A | A | A | A |
| Cycle test | Capacity retention | % | 93 | 95 | 93 | 93 |
| | Assessment | — | A | A | A | A |
| Oven test (150° C.) | Time to ignition | min | 45 | 37 | 44 | 45 |
| | Assessment | — | B | B | B | B |
| Impact test | Cell temperature (maximum of N = 5) | ° C. | 28 | 29 | 28 | 29 |
| | Assessment | — | A | A | A | A |

| Microporous membrane properties | | | Example 33 | Example 34 | Example 35 | Example 36 |
|---|---|---|---|---|---|---|
| Membrane thickness | | μm | 4.5 | 5.8 | 6.1 | 4.1 |
| Porosity | | % | 36 | 37 | 33 | 34 |
| Air permeability | | s/100 cc | 123 | 138 | 162 | 152 |
| Puncture strength | | gf | 320 | 360 | 352 | 301 |
| Puncture strength | | gf/(gf/m²) | 117 | 104 | 91 | 117 |
| Microporous membrane melting point (2nd peak in DSC) | | ° C. | 136 | 135 | 136 | 136 |
| Pore size | | μm | 0.046 | 0.042 | 0.032 | 0.043 |
| TMA Maximum shrinkage stress (MD) | | gf | 2.7 | 3.1 | 3.1 | 2.8 |
| TMA Maximum shrinkage stress (TD) | | gf | 2.5 | 2.8 | 2.5 | 2.1 |
| MD heat shrinkage factor at 120° C. | | % | 11.6 | 13.5 | 13.2 | 11.1 |
| TD heat shrinkage factor at 120° C. | | % | 13.4 | 14.5 | 10.1 | 9.4 |
| MD heat shrinkage factor at 150° C. | | % | 66.9 | 65.1 | 62.1 | 68.9 |

TABLE 4-5-continued

|  |  |  |  |  |  |  |
|---|---|---|---|---|---|---|
| | TD heat shrinkage factor at 150° C. | % | 68.1 | 62.4 | 58.6 | 65.6 |
| | Shutdown temperature | ° C. | 149 | 145 | 147 | 148 |
| | Membrane rupture temperature | ° C. | 194 | 190 | 198 | 192 |
| Temperature modulated DSC Nonrev. | Low-temperature end peak temperature | ° C. | 138.9 | 138.5 | 137.1 | 137.5 |
| | High-temperature end peak temperature | ° C. | 146.5 | 145.2 | 144.4 | 145.9 |
| | Temperature of maximum endothermic peak | ° C. | 146.5 | 145.2 | 144.4 | 145.9 |
| Temperature modulated DSC Rev. | Quantity of heat to 120° C. | J/g | 53.1 | 54.9 | 52.1 | 51.7 |
| | Peak temperature | ° C. | 135.6 | 136.5 | 135.6 | 135.5 |
| Output test | Output characteristic value (5 C capacity/1 C capacity) | — | 0.91 | 0.91 | 0.85 | 0.96 |
| | Assessment | | A | A | B | B |
| Cycle test | Capacity retention | % | 83 | 87 | 93 | 86 |
| | Assessment | — | B | B | A | B |
| Oven test (150° C.) | Time to ignition | min | 47 | 41 | 48 | 48 |
| | Assessment | — | B | B | B | B |
| Impact test | Cell temperature (maximum of N = 5) | ° C. | 29 | 35 | 50 | 29 |
| | Assessment | — | A | B | B | A |

TABLE 4-6

| Microporous membrane properties | | | Example 37 | Example 38 | Example 39 | Example 40 |
|---|---|---|---|---|---|---|
| | Membrane thickness | μm | 4 | 10.1 | 4.7 | 4.1 |
| | Porosity | % | 37 | 36 | 35 | 38 |
| | Air permeability | s/100 cc | 113 | 167 | 141 | 114 |
| | Puncture strength | gf | 298 | 441 | 345 | 253 |
| | Puncture strength | gf/(gf/m²) | 124 | 72 | 119 | 105 |
| | Microporous membrane melting point (2nd peak in DSC) | ° C. | 136 | 136 | 135 | 135 |
| | Pore size | μm | 0.033 | 0.038 | 0.038 | 0.038 |
| | TMA Maximum shrinkage stress (MD) | gf | 2.6 | 4.3 | 2.8 | 2.4 |
| | TMA Maximum shrinkage stress (TD) | gf | 2.4 | 4.1 | 2.4 | 2.2 |
| | MD heat shrinkage factor at 120° C. | % | 11.1 | 12.1 | 12.1 | 12.0 |
| | TD heat shrinkage factor at 120° C. | % | 14.3 | 10.3 | 12.5 | 11.2 |
| | MD heat shrinkage factor at 150° C. | % | 65.3 | 59.2 | 66.9 | 66.2 |
| | TD heat shrinkage factor at 150° C. | % | 71.2 | 58.9 | 63.1 | 63.4 |
| | Shutdown temperature | ° C. | 150 | 144 | 146 | 151 |
| | Membrane rupture temperature | ° C. | 200< | 167 | 163 | 171 |
| Temperature modulated DSC Nonrev. | Low-temperature end peak temperature | ° C. | 137.6 | 137.9 | 136.8 | 136.6 |
| | High-temperature end peak temperature | ° C. | 146.6 | 141.1 | 145.9 | 145.3 |
| | Temperature of maximum endothermic peak | ° C. | 146.6 | 137.9 | 145.9 | 145.3 |
| Temperature modulated DSC Rev. | Quantity of heat to 120° C. | J/g | 53.6 | 52.9 | 53.5 | 53 |
| | Peak temperature | ° C. | 135.4 | 135.5 | 134.5 | 134.7 |
| Output test | Output characteristic value (5 C capacity/1 C capacity) | — | 0.91 | 0.91 | 0.90 | 0.93 |
| | Assessment | | A | A | A | A |
| Cycle test | Capacity retention | % | 94 | 91 | 91 | 91 |
| | Assessment | — | A | A | A | A |
| Oven test (150° C.) | Time to ignition | min | 42 | 46 | 46 | 45 |
| | Assessment | — | B | B | B | B |
| Impact test | Cell temperature (maximum of N = 5) | ° C. | 28 | 99 | 29 | 34 |
| | Assessment | — | A | B | A | B |

| Microporous membrane properties | | | Example 41 | Example 42 | Example 43 | Example 44 |
|---|---|---|---|---|---|---|
| | Membrane thickness | μm | 4.7 | 5.1 | 4.6 | 4.5 |
| | Porosity | % | 35 | 37 | 36 | 38 |
| | Air permeability | s/100 cc | 142 | 134 | 173 | 152 |
| | Puncture strength | gf | 310 | 391 | 236 | 365 |
| | Puncture strength | gf/(gf/m²) | 107 | 128 | 84 | 138 |
| | Microporous membrane melting point (2nd peak in DSC) | ° C. | 136 | 136 | 136 | 136 |
| | Pore size | μm | 0.048 | 0.037 | 0.031 | 0.032 |
| | TMA Maximum shrinkage stress (MD) | gf | 2.6 | 3.6 | 3.2 | 3.2 |
| | TMA Maximum shrinkage stress (TD) | gf | 2.2 | 2.9 | 2.7 | 2.8 |
| | MD heat shrinkage factor at 120° C. | % | 10.5 | 14.2 | 16.4 | 12.5 |
| | ID heat shrinkage factor at 120° C. | % | 10.2 | 14.9 | 15.3 | 14.2 |

TABLE 4-6-continued

|  |  |  |  |  |  |  |
|---|---|---|---|---|---|---|
| MD heat shrinkage factor at 150° C. | | % | 68.1 | 67.2 | 63.4 | 65.4 |
| TD heat shrinkage factor at 150° C. | | % | 61.2 | 69.1 | 58.1 | 64.5 |
| Shutdown temperature | | ° C. | 148 | 148 | 151 | 150 |
| Membrane rupture temperature | | ° C. | 193 | 158 | 200< | 190 |
| Temperature modulated DSC Nonrev. | Low-temperature end peak temperature | ° C. | 137.1 | 137.4 | 137.5 | 137.9 |
| | High-temperature end peak temperature | ° C. | 145.5 | 146.9 | 142.2 | 147.1 |
| | Temperature of maximum endothermic peak | ° C. | 145.5 | 146.9 | 142.2 | 147.1 |
| Temperature modulated DSC Rev. | Quantity of heat to 120° C. | J/g | 52.2 | 54.1 | 58.5 | 53.8 |
| | Peak temperature | ° C. | 135.4 | 135.7 | 135.5 | 135.6 |
| Output test | Output characteristic value (5 C capacity/1 C capacity) | — | 0.91 | 0.93 | 0.92 | 0.94 |
| | Assessment | | A | A | A | A |
| Cycle test | Capacity retention | % | 81 | 92 | 96 | 95 |
| | Assessment | — | B | A | A | A |
| Oven test (150° C.) | Time to ignition | min | 42 | 41 | 35 | 44 |
| | Assessment | — | B | B | B | B |
| Impact test | Cell temperature (maximum of N = 5) | ° C. | 34 | 27 | 95 | 26 |
| | Assessment | — | B | A | B | A |

TABLE 5-1

| Microporous membrane properties | | Comparative Example 1 | Comparative Example 2 | Comparative Example 3 | Comparative Example 4 | Comparative Example 5 | Comparative Example 6 |
|---|---|---|---|---|---|---|---|
| Viscosity-average molecular weight | ×10,000 | 81 | 81 | 81 | 81 | 105 | 54 |
| Membrane thickness | μm | 10 | 5.5 | 8.5 | 5.5 | 26 | 12 |
| Porosity | % | 38 | 38 | 38 | 38 | 40 | 52 |
| Air permeability | s/100 cm³ | 200 | 85 | 185 | 100 | 710 | 180 |
| Puncture strength | gf | 500 | 420 | 380 | 275 | 590 | 380 |
| Basis weight-equivalent puncture strength | gf/(g/m²) | 85 | 130 | 76 | 85 | 40 | 69 |
| Pore size | μm | 0.030 | 0.050 | 0.032 | 0.040 | 0.035 | 0.035 |
| Shutdown temperature | ° C. | 141.1 | 148.9 | 142.0 | 143.3 | 140.8 | 139.1 |
| TMA Maximum shrinkage stress (MD) | gf | 3.8 | 3.2 | 2.9 | 2.0 | 4.4 | 2.9 |
| TMA Maximum shrinkage stress (TD) | gf | 3.4 | 3.0 | 2.7 | 1.9 | 4.1 | 2.6 |
| MD heat shrinkage factor at 120° C. | % | 5.5 | 25.2 | 5.5 | 4.5 | 10.0 | 19.5 |
| TD heat shrinkage factor at 120° C. | % | 4.8 | 26.2 | 4.8 | 4.1 | 11.5 | 19.5 |
| Temperature modulated DSC Nonrev. | Low-temperature end peak temperature | ° C. | 138.4 | 140 | 138.5 | 138.5 | 138.1 | 138.8 |
| | High-temperature end peak temperature | ° C. | No peak | No peak | No peak | 140.2 | 140.8 | 140,8 |
| | Temperature of maximum endothermic peak | ° C. | 138.4 | 140 | 138.4 | 138.5 | 138.1 | 138.8 |
| Temperature modulated DSC Rev. | Quantity of heat to 120° C. | J/g | 48 | 70 | 54 | 48 | 48 | 52 |
| | Peak temperature | ° C. | 135.2 | 136.5 | 135.5 | 135.2 | 135.8 | 136.5 |
| Output test | Output characteristic value (5 C capacity/1 C capacity) | — | 0.92 | 0.92 | 0.89 | 0.92 | 0.79 | 0.95 |
| | Assessment | | A | A | B | A | C | A |
| Cycle test | Capacity retention | % | 97 | 79 | 95 | 79 | 92 | 84 |
| | Assessment | — | A | C | A | C | A | B |
| Oven test (150° C.) | Time to ignition | min | 45 | 15 | >60 | >60 | 57 | 28 |
| | Assessment | — | B | C | A | A | B | C |
| Impact test | Cell temperature (maximum of N = 5) | ° C. | >100 | 28 | >100 | >100 | >100 | >100 |
| | Assessment | — | C | A | C | C | C | C |

TABLE 5-2

| Microporous membrane properties | | Comparative Example 7 | Comparative Example 8 | Comparative Example 9 | Comparative Example 10 | Comparative Example 11 |
|---|---|---|---|---|---|---|
| Viscosity-average molecular weight | ×10,000 | 63 | 180 | 42 | 81 | 66 |
| Membrane thickness | μm | 5.5 | 5.5 | 5.5 | 5.5 | 12 |
| Porosity | % | 38 | 38 | 38 | 38 | 45 |
| Air permeability | s/100 cm³ | 100 | 160 | 120 | 100 | 164 |
| Puncture strength | gf | 350 | 415 | 260 | 330 | 645 |
| Basis weight-equivalent puncture strength | gf/(g/m²) | 108 | 128 | 80 | 102 | 103 |
| Pore size | μm | 0.052 | 0.028 | 0.041 | 0.051 | 0.036 |

TABLE 5-2-continued

| Microporous membrane properties | | | Comparative Example 7 | Comparative Example 8 | Comparative Example 9 | Comparative Example 10 | Comparative Example 11 |
|---|---|---|---|---|---|---|---|
| Shutdown temperature | | ° C. | 148.9 | 149.8 | 138.9 | 147.5 | 146.5 |
| TMA Maximum shrinkage stress (MD) | | gf | 2.6 | 3.2 | 2.0 | 2.5 | 4.8 |
| TMA Maximum shrinkage stress (TD) | | gf | 2.4 | 3.0 | 1.8 | 2.1 | 4.4 |
| MD heat shrinkage factor at 120° C. | | % | 5.5 | 26.5 | 4.5 | 6.5 | 16.5 |
| TD heat shrinkage factor at 120° C. | | % | 4.8 | 27.8 | 3.8 | 3.0 | 16.4 |
| Temperature modulated DSC Nonrev. | Low-temperature end peak temperature | ° C. | 138.4 | 140.6 | 137.1 | 138.8 | 138.5 |
| | High-temperature end peak temperature | ° C. | No peak | No peak | No peak | No peak | No peak |
| | Temperature of maximum endothermic peak | ° C. | 138.4 | 140.6 | 137.1 | 139.1 | 139.1 |
| Temperature modulated DSC Rev. | Quantity of heat to 120° C. | J/g | 48 | 62 | 38 | 39.8 | 42.8 |
| | Peak temperature | ° C. | 135.2 | 138.5 | 133.3 | 135.5 | 132 |
| Output test | Output characteristic value (5 C capacity/1 C capacity) | — | 0.92 | 0.85 | 0.92 | 0.92 | 0.96 |
| | Assessment | | A | B | A | A | A |
| Cycle test | Capacity retention | % | 77 | 97 | 86 | 79 | 91 |
| | Assessment | — | C | A | B | C | A |
| Oven test (150° C.) | Time to ignition | min | 58 | 23 | >60 | >60 | 26 |
| | Assessment | — | B | C | A | A | C |
| Impact test | Cell temperature (maximum of N = 5) | ° C. | >100 | 29 | >100 | >100 | >100 |
| | Assessment | — | C | A | C | C | C |

TABLE 6

| Membrane-forming conditions | | | Example 45 | Example 46 | Example 47 | Example 48 |
|---|---|---|---|---|---|---|
| PO Microporous membrane | Example No. of substrate membrane used | | Example 1 | Example 5 | Example 5 | Example 27 |
| | Thickness | μm | 5.5 | 12 | 12 | 5.5 |
| | Porosity | % | 38 | 45 | 45 | 36 |
| | Air permeability | s/100 cm³ | 120 | 160 | 160 | 150 |
| | Puncture strength | gf | 377 | 630 | 630 | 440 |
| | Basis weight-equivalent puncture strength | gf/(g/m²) | 116 | 100 | 100 | 132 |
| | Pore size | μm | 0.035 | 0.038 | 0.038 | 0.031 |
| Porous layer | Coating layer thickness | μm | 2.0 | 2.0 | 2.0 | 2.0 |
| | Filler material | — | Boehmite | Boehmite | Boehmite | Boehmite |
| | Filler particle size D50 | μm | 0.7 | 0.7 | 0.5 | 0.7 |
| | Binder type | — | Acryl latex | Acryl latex | Acryl latex | Acryl latex |

TABLE 7

| Multilayered microporous membrane properties | | | Example 45 | Example 46 | Example 47 | Example 48 |
|---|---|---|---|---|---|---|
| Membrane thickness | | μm | 7.5 | 14 | 14 | 7.5 |
| Air permeability | | s/100 cm³ | 130 | 170 | 180 | 150 |
| Puncture strength | | gf | 377 | 630 | 630 | 440 |
| Basis weight-equivalent puncture strength | | gf/(g/m²) | 116 | 100 | 100 | 132 |
| Base material pore size | | μm | 0.035 | 0.038 | 0.038 | 0.031 |
| Shutdown temperature | | | 148.5 | 146.7 | 146.7 | 149.6 |
| MD heat shrinkage factor at 120° C. | | % | 2.0 | 8.5 | 2.2 | 4.1 |
| TD heat shrinkage factor at 120° C. | | % | 1.5 | 8.2 | 2.0 | 3.5 |
| Temperature modulated DSC Nonrev. | Low-temperature end peak temperature | ° C. | 139.4 | 138.8 | 138.8 | 139.1 |
| | High-temperature end peak temperature | ° C. | 146.2 | 145.1 | 145.1 | 146.2 |
| | Temperature of maximum endothermic peak | ° C. | 146.2 | 145.1 | 145.1 | 146.2 |
| Temperature modulated DSC Rev. | Quantity of heat to 120° C. | J/g | 52.9 | 53 | 53 | 51.8 |
| | Peak temperature | ° C. | 135.4 | 136 | 136 | 136.2 |
| Output test | | | A | A | A | B |
| Cycle test | | | A | A | A | A |

TABLE 7-continued

| Multilayered microporous membrane properties | | | Example 45 | Example 46 | Example 47 | Example 48 |
|---|---|---|---|---|---|---|
| Oven test (150° C.) | Time to ignition | min | >60 | 58 | >60 | >60 |
| | Assessment | — | A | A | A | A |
| Impact test | Cell temperature (maximum of N = 5) | ° C. | 28 | 30 | 30 | 28 |
| | Assessment | — | A | A | A | A |

As is clear from the results in Table 4, in the Examples in which the peak temperature at the high-temperature end for non-reversing heat flow in temperature modulated DSC was 141.0° C. or higher, it was possible to obtain separators that were satisfactory in oven testing and impact testing. In particular, a higher viscosity-average molecular weight of the PO microporous membrane tended to shift the peak temperature at the high-temperature end for non-reversing heat flow further toward the high-temperature end, resulting in more satisfactory results in impact testing (Example 1 vs. Example 16 vs. Example 17 vs. Example 18). In addition, membranes with higher Mw/Mn or Mz/Mw values of the PE starting material exhibited higher levels in both oven testing and impact testing (Example 1 vs. Example 20). Oven testing was also found to be improved by introducing a porous layer including inorganic particles with the PO microporous membrane, compared to the PO microporous membrane alone (Example 1 vs. Example 45).

The invention claimed is:

1. A polyolefin microporous membrane comprising polyethylene, wherein a non-reversing heat flow melting peak of the polyolefin microporous membrane measured with temperature increase by temperature modulated DSC at a temperature-elevating rate of 1° C./min is in the range of 141.0° C. to 150.0° C.

2. The polyolefin microporous membrane according to claim 1, which has a maximum peak height in the range of 141.0° C. to 150.0° C. among the non-reversing heat flow melting peaks measured by temperature modulated DSC at a temperature-elevating rate of 1° C./min.

3. The polyolefin microporous membrane according to claim 1, wherein the viscosity-average molecular weight (Mv) of the polyolefin microporous membrane is 400,000 to 2,000,000.

4. The polyolefin microporous membrane according to claim 1, wherein the polyolefin microporous membrane includes, as the polyethylene, a polyethylene starting material with a viscosity-average molecular weight (Mv) of 600,000 to 2,000,000 at 55 weight % or greater based on the weight of the polyolefin microporous membrane.

5. The polyolefin microporous membrane according to claim 1, wherein the heat shrinkage factor of the polyolefin microporous membrane at 120° C. is 15% or lower in both the MD and TD.

6. The polyolefin microporous membrane according to claim 1, wherein the heat of fusion of the polyolefin microporous membrane at 120.0° C. or lower, for the reversing heat flow measured by temperature modulated DSC at a temperature-elevating rate of 1° C./min, is 45 J/g or greater.

7. The polyolefin microporous membrane according to claim 1, wherein the basis weight-equivalent puncture strength of the polyolefin microporous membrane is 70 gf/(g/m$^2$) or greater.

8. The polyolefin microporous membrane according to claim 1, wherein the mean pore size of the polyolefin microporous membrane measured according to the half-dry method is 0.050 μm or smaller.

9. The polyolefin microporous membrane according to claim 1, wherein the maximum shrinkage stress of the polyolefin microporous membrane in thermomechanical analysis (TMA) is 4.0 gf or lower in both the MD and TD.

10. The polyolefin microporous membrane according to claim 1, wherein the membrane thickness of the polyolefin microporous membrane is 15 μm or smaller.

11. A separator for an electrochemical device comprising a polyolefin microporous membrane according to claim 1.

12. An electrochemical device comprising the separator for an electrochemical device according to claim 11.

13. The polyolefin microporous membrane according to claim 2, wherein the viscosity-average molecular weight (Mv) of the polyolefin microporous membrane is 400,000 to 2,000,000.

* * * * *